(12) United States Patent
Khaira et al.

(10) Patent No.: US 12,194,374 B2
(45) Date of Patent: *Jan. 14, 2025

(54) GAME CONTROLLER FOR A MOBILE DEVICE WITH EXTENDED BUMPER BUTTON

(71) Applicant: Backbone Labs, Inc., Vancouver, WA (US)

(72) Inventors: Maneet Singh Khaira, Vancouver, WA (US); Atsushi Shirata, Neyagawa (JP); Gregory Robert Cerny, Palo Alto, CA (US); Wei-Jun Wang, Menlo Park, CA (US); Jon Lake, Sunnyvale, CA (US)

(73) Assignee: Backbone Labs, Inc., Vancouver, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 17/504,299

(22) Filed: Oct. 18, 2021

(65) Prior Publication Data

US 2022/0032179 A1 Feb. 3, 2022

Related U.S. Application Data

(63) Continuation-in-part of application No. 16/808,339, filed on Mar. 3, 2020, now Pat. No. 11,389,721.

(51) Int. Cl.
*A63F 13/24* (2014.01)
*A63F 13/214* (2014.01)
(Continued)

(52) U.S. Cl.
CPC .......... *A63F 13/24* (2014.09); *A63F 13/214* (2014.09); *A63F 13/23* (2014.09); *A63F 13/92* (2014.09); *A63F 2300/1043* (2013.01)

(58) Field of Classification Search
CPC .......... A63F 13/24; A63F 13/92; A63F 13/23; A63F 13/98; A63F 13/20
See application file for complete search history.

(56) References Cited

U.S. PATENT DOCUMENTS 4,636,593 A 1/1987 Novak
6,238,289 B1 5/2001 Sobota
(Continued)

FOREIGN PATENT DOCUMENTS

CA 3169951 A1 9/2021
CN 101739162 A 6/2010
(Continued)

OTHER PUBLICATIONS

US 12,029,974 B1, 07/2024, Maker (withdrawn)
(Continued)

*Primary Examiner* — Peter J Iannuzzi
(74) *Attorney, Agent, or Firm* — Crowell & Moring LLP

(57) ABSTRACT

A game controller for a mobile device that includes a first handle, a first bumper, and a first switch. The first handle is configured to contact and support a mobile device. The first bumper is coupled to the first handle. The first bumper is configured to accept touch inputs. The first bumper includes a pivot rod at a first end of the first bumper that is configured to engage a track slot of the first handle. The pivot rod is configured to rotate within the track slot and to translate within the track slot. The first bumper further includes a plunger at a first-span distance from the pivot rod. The first switch is within the first handle and is configured to be activated by touch inputs to the first bumper. The plunger of the first bumper is configured to contact and impart a force to the first switch.

19 Claims, 10 Drawing Sheets

(51) Int. Cl.
*A63F 13/23* (2014.01)
*A63F 13/92* (2014.01)

(56) References Cited

U.S. PATENT DOCUMENTS

| | | |
|---|---|---|
| 6,640,268 B1 | 10/2003 | Kumar |
| 6,684,062 B1 | 1/2004 | Gosior |
| 6,761,462 B2 | 7/2004 | Yoshida |
| 6,965,368 B1 | 11/2005 | Andrews et al. |
| 7,477,239 B2 | 1/2009 | Ray |
| 7,580,728 B2 | 8/2009 | Vance et al. |
| 7,905,627 B2 | 3/2011 | Chiang |
| 8,462,810 B2 | 6/2013 | Spinar |
| 8,760,394 B2 | 6/2014 | Chiang |
| 8,822,851 B2 | 9/2014 | Walker |
| 9,053,243 B2 | 6/2015 | Townsend |
| 9,677,740 B2 | 6/2017 | Steiner |
| 10,025,644 B2 | 7/2018 | Iwaya et al. |
| 10,258,876 B2 | 4/2019 | Wells et al. |
| 10,259,384 B2 | 4/2019 | Teng |
| 10,300,386 B1 | 5/2019 | Leung et al. |
| 10,483,969 B2 | 11/2019 | Kontani |
| 10,599,233 B1 | 3/2020 | Amalou |
| 10,725,557 B2 | 7/2020 | Kontani |
| 10,741,215 B1 | 8/2020 | Sundareson |
| 10,868,436 B1 | 12/2020 | Chen et al. |
| 11,000,759 B2 | 5/2021 | Palmer et al. |
| 11,090,557 B2 | 8/2021 | Downs et al. |
| 11,105,969 B2 | 8/2021 | Sasagawa |
| 11,389,721 B2 | 7/2022 | Khaira et al. |
| 11,662,855 B1 | 5/2023 | Sorensen et al. |
| 11,707,670 B2 * | 7/2023 | Khaira ............... A63F 13/214 463/37 |
| 11,826,642 B2 | 11/2023 | Khaira et al. |
| 11,839,810 B2 | 12/2023 | Khaira et al. |
| 11,853,505 B1 | 12/2023 | Sorensen et al. |
| 12,070,678 B2 | 8/2024 | Maker |
| 12,074,946 B2 | 8/2024 | Wei et al. |
| 2002/0173354 A1 | 11/2002 | Winans |
| 2005/0017953 A1 | 1/2005 | Pekka |
| 2005/0172045 A1 | 8/2005 | Bermudez et al. |
| 2005/0243585 A1 | 11/2005 | Marchant |
| 2005/0247550 A1 | 11/2005 | Hamada |
| 2006/0132458 A1 | 6/2006 | Garfio |
| 2006/0234794 A1 | 10/2006 | Baseflug et al. |
| 2006/0236002 A1 | 10/2006 | Valenci |
| 2007/0152965 A1 | 7/2007 | Krzyzanowski |
| 2007/0155511 A1 | 7/2007 | Grundstedt |
| 2007/0236959 A1 | 10/2007 | Tolbert |
| 2008/0202907 A1 | 8/2008 | Kyowski |
| 2008/0294453 A1 | 11/2008 | Baird-Smith |
| 2009/0065337 A1 | 3/2009 | Chiang |
| 2009/0077277 A1 | 3/2009 | Vidal |
| 2009/0219734 A1 | 9/2009 | Sawada |
| 2009/0284397 A1 | 11/2009 | Lee |
| 2010/0067424 A1 | 3/2010 | Sun |
| 2010/0115050 A1 | 5/2010 | Sultenfuss |
| 2010/0137033 A1 | 6/2010 | Lee |
| 2010/0271839 A1 | 10/2010 | Chan |
| 2011/0014984 A1 | 1/2011 | Penman et al. |
| 2011/0084904 A1 | 4/2011 | Tan |
| 2012/0145522 A1 | 6/2012 | Lee |
| 2012/0200475 A1 | 8/2012 | Baker |
| 2012/0225258 A1 | 9/2012 | Hill |
| 2013/0033829 A1 | 2/2013 | Furubo et al. |
| 2013/0077346 A1 | 3/2013 | Chen |
| 2013/0191625 A1 | 7/2013 | Mullens et al. |
| 2013/0225288 A1 | 8/2013 | Levin et al. |
| 2013/0237322 A1 | 9/2013 | Sobel |
| 2014/0018173 A1 | 1/2014 | Urhman |
| 2014/0024392 A1 | 1/2014 | Su |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0274394 A1 | 9/2014 | Willis |
| 2014/0304494 A1 | 10/2014 | Hawver |
| 2014/0317329 A1 | 10/2014 | Barnett et al. |
| 2014/0375545 A1 | 12/2014 | Ackerman et al. |
| 2015/0018101 A1 | 1/2015 | Schoenith et al. |
| 2015/0031452 A1 | 1/2015 | Rundell |
| 2015/0128042 A1 | 5/2015 | Churchill et al. |
| 2015/0217191 A1 | 8/2015 | Yan |
| 2015/0273325 A1 * | 10/2015 | Falc ............... A63F 13/24 463/37 |
| 2015/0281422 A1 | 10/2015 | Kessler et al. |
| 2016/0132114 A1 | 5/2016 | Rihn |
| 2016/0180811 A1 | 6/2016 | Colenbrander |
| 2016/0317919 A1 * | 11/2016 | Gassoway ............. A63F 13/245 |
| 2016/0329533 A1 | 11/2016 | Tajima |
| 2017/0056762 A1 | 3/2017 | Gafni |
| 2017/0205881 A1 | 7/2017 | Yamashita |
| 2018/0004250 A1 | 1/2018 | Barnett et al. |
| 2018/0056176 A1 | 3/2018 | Sakamoto |
| 2018/0133594 A1 | 5/2018 | Guo |
| 2018/0250588 A1 | 9/2018 | Winick |
| 2018/0345136 A1 * | 12/2018 | Schmitz ............... G06F 3/0362 |
| 2018/0369692 A1 | 12/2018 | Winick |
| 2019/0079584 A1 | 3/2019 | Bonanno et al. |
| 2019/0080549 A1 | 3/2019 | Lewis |
| 2019/0230400 A1 | 7/2019 | Van Os |
| 2019/0358534 A1 | 11/2019 | Fang et al. |
| 2019/0379231 A1 | 12/2019 | Gonzalez et al. |
| 2020/0155928 A1 | 5/2020 | Guo |
| 2020/0206636 A1 | 7/2020 | Schultz et al. |
| 2020/0278758 A1 | 9/2020 | McAllen |
| 2020/0282309 A1 | 9/2020 | Liao |
| 2020/0353351 A1 | 11/2020 | Mao |
| 2020/0353369 A1 | 11/2020 | Esselstrom et al. |
| 2020/0406140 A1 | 12/2020 | Sundareson |
| 2021/0093951 A1 | 4/2021 | Mahlmeister et al. |
| 2021/0104907 A1 | 4/2021 | Chen et al. |
| 2021/0154584 A1 | 5/2021 | O'Connor et al. |
| 2021/0197082 A1 | 7/2021 | Seibert et al. |
| 2021/0275907 A1 | 9/2021 | Khaira et al. |
| 2021/0308566 A1 | 10/2021 | Kong et al. |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0096923 A1 | 3/2022 | O'Leary et al. |
| 2022/0135273 A1 | 5/2022 | Malone |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith et al. |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2023/0271082 A1 | 8/2023 | Khaira et al. |
| 2023/0356076 A1 | 11/2023 | Maker |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 | 6/2018 |
| CN | 207838250 | 9/2018 |
| CN | 208115138 | 11/2018 |
| CN | 208636809 U | 3/2019 |
| CN | 209392718 U | 9/2019 |
| CN | 113426104 A | 9/2021 |
| CN | 115427123 A | 12/2022 |

(56) References Cited

FOREIGN PATENT DOCUMENTS

| | | |
|---|---|---|
| CN | 115427123 B | 2/2024 |
| EP | 1380324 | 1/2004 |
| EP | 1380324 A1 | 1/2004 |
| EP | 1380324 B1 | 9/2005 |
| EP | 2025369 A2 | 2/2009 |
| EP | 2136225 A1 | 12/2009 |
| EP | 2136225 B1 | 6/2012 |
| EP | 4114540 A1 | 1/2023 |
| GB | 2608588 A | 1/2023 |
| JP | 2004139847 A | 5/2004 |
| JP | 2014210079 A | 11/2014 |
| JP | 2023516421 A | 4/2023 |
| TW | 201036020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO2021/178242 A1 | 9/2021 |
| WO | WO2022/161834 A1 | 8/2022 |
| WO | 2023034596 A1 | 3/2023 |
| WO | WO2023/172202 A1 | 9/2023 |
| WO | WO2024/006587 A1 | 1/2024 |
| WO | WO2024/097301 A1 | 5/2024 |
| WO | WO2024/107651 A1 | 5/2024 |
| WO | WO2024/107654 A2 | 5/2024 |
| WO | WO2024/137106 A1 | 6/2024 |
| WO | WO2024/148214 A1 | 7/2024 |

OTHER PUBLICATIONS

US 12,047,455 B2, 07/2024, Wei et al. (withdrawn)
International Search Authority, International Search Report and Opinion, Jun. 9, 2021, European Patent Office.
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/850,912, filed Jul. 2022, Khaira.
U.S. Appl. No. 17/856,895, filed Jul. 2022, Khaira.
U.S. Appl. No. 17/866,166, filed Jul. 2022, Khaira et al.
U.S. Appl. No. 17/866,234, filed Jul. 2022, Khaira et al.
U.S. Appl. No. 17/987,772, filed Nov. 2022, Sorensen.
U.S. Appl. No. 18/076,121, filed Dec. 2022, Donlan et al.
U.S. Appl. No. 18/076,146, filed Dec. 2022, Wei et al.
U.S. Appl. No. 18/076,172, filed Dec. 2022, Chow et al.
U.S. Appl. No. 18/086,077, filed Dec. 2022, Maker.
U.S. Appl. No. 18/086,103, filed Dec. 2022, Maker.
U.S. Appl. No. 18/136,509, filed Apr. 2023, O'Connor.
U.S. Appl. No. 18/138,377, filed Apr. 2023, Sorensen et al.
U.S. Appl. No. 18/195,152, filed May 2023, Khaira.
U.S. Appl. No. 18/202,755, filed May 2023, Aldridge et al.
U.S. Appl. No. 18/214,917, filed Jun. 2023, O'Connor.
U.S. Appl. No. 18/214,949, filed Jun. 2023, O'Connor.
U.S. Appl. No. 18/224,508, filed Jul. 2023, Maker.
U.S. Appl. No. 18/226,883, filed Jul. 2023, Khaira et al.
U.S. Appl. No. 18/226,892, filed Jul. 2023, Boegli.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25. 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2023/031919, mailed Nov. 17, 2023 (14 pages).
International Search Report and Written Opinion of the International Searching Authority, issued in International Application No. PCT/US2020/061291, mailed Feb. 24, 2021, 20 pages.
"AVPictureInPictureController: A controller that responds to user-initiated Picture in Picture playback of video in a floating, resizable window"; Apple Developer Documentation, AVKit; downloaded from the Internet on Nov. 27, 2022 at https://developer.apple.com/documentation/avkit/avpictureinpicturecontroller; Apple Inc; 2022; 8 pages.
"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.
"Backbone One"; Mobile gaming hardware product page; Backbone; Dec. 9, 2022; 7 pages.
"Digital Depth: ALL Controller Universal & Fully Customizable"; Kickstarter project page for customizable game controller; Digital Depth Inc.; Aug. 4, 2021; 25 pages.
"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.
"Game Center"; Apple Developer Game Center overview; downloaded from the Internet on Nov. 29, 2022 at https://developer.apple.com/game-center/; Apple Inc.; 2022; 4 pages.
"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.
"GitHub—Kofktu/PIPKit: Picture in Picture for iOS"; downloaded from the Internet on Nov. 27, 2022 at https://github.com/Kofktu/PIPKit; GitHub, Inc.; 2022; 11 pages.
"How to implement Picture in Picture Webview on IOS Swift?"; StackOverflow Questions; downloaded from the Internet on Nov. 28, 2022 at https://stackoverflow.com/questions/69565199/how-to-implement-picture-in-picture-webview-on-ios-swift; StackOverflow; Oct. 14, 2021; 2 pages.
"PhoneJoy Play: Turn your phone into a console!"; Kickstarter project page for compact gamepad; PhoneJoy Solutions America, Inc.; Jul. 29, 2014; 42 pages.
"Picture-in-picture (PiP) support"; Android Developers UI Guide; downloaded from the Internet on Nov. 27, 2022 at https://developer.android.com/develop/ui/views/picture-in-picture; Nov. 11, 2022; 10 pages.

(56) References Cited

OTHER PUBLICATIONS

"Picture-in-Picture API—Web APIs / MDN"; downloaded from the Internet on Nov. 27, 2022 at https://developer.mozilla.org/en-US/docs/Web/API/Picture-in-Picture_API; Mozilla Corporation; Oct. 10, 2022; 4 pages.
"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.
"Rayz Pro"; Pioneer Rayz™ Pro earbuds product page; downloaded from the Internet on Aug. 16, 2023 at Rayz Pro Earphone—Pioneer Rayz; Pioneer Rayz; 2023; 9 pages.
"User Notifications: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.
"Why queue in geforce now so long? I try to answer for this question" Reddit, GeForceNOW comments; downloaded from the Internet on Jun. 7, 2023 at why queue in geforce now so long? I try to answer for this question : r/GeForceNOW (reddit.com); Reddit Inc.; Jun. 1, 2023; 6 pages.
Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.
Box.co.uk; "How Does the Samsung Gaming Hub Work?"; YouTube product tutorial; downloaded from the Internet on Nov. 29, 2022 at https://www.youtube.com/watch?v=uAT4tZR3mNk; YouTube; Oct. 2022; 5 pages.
Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Feb. 10, 2007], 6 pages.
Faulkner, C.; "Backbone's excellent phone controller is now shipping for Android" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022; 20 pages.
Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27, 2021; 12 pages.
Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox Cloud Gaming 'Lots of people are playing' Fix: Why is queue taking so long?—GameRevolution; Game Revolution; Dec. 13, 2021; 6 pages.
Max Tech; Backbone One Review—The BEST iPhone Gaming Controller!; YouTube product review video; downloaded from the Internet on Nov. 29, 2022 at https://www.youtube.com/watch?v=zRJth2nzDo; YouTube; Jun. 2022; 4 pages.
Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.
Schofield, T.; "Logitech G Cloud Unboxing and Hands On!"; YouTube product review video; downloaded from the Internet on Nov. 29, 2022 at https://www.youtube.com/watch?v=speoPL5vqX0; YouTube; Nov. 2022; 3 pages.
Sholtz, M.; "The Razer Kishi V2 offers a new Virtual Controller mode, and it's pretty slick"; Android Police Newsletter article; downloaded from the Internet on Aug. 16, 2023 at The Razer Kishi V2 offers a new Virtual Controller mode, and it's pretty slick (androidpolice.com); Jan. 21, 2023; 7 pages.
Tech & Design; "How to Set Up New Nintendo Switch | Beginners Guide | First Time Turning On"; YouTube product review video; downloaded from the Internet on Nov. 29, 2022 at https://www.youtube.com/watch?v=XtMcQ9lAkCc; YouTube; 2021; 4 pages.
Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.
Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a-revitalized-game-center-exploring-apples-2020-gaming-updates/; MacStories, Inc.; Aug. 27, 2020; 14 pages.
Wagner, "Developing Your Own Replay System," Feb. 4, 2004, Retrieved from the Internet: URL: http://www.Jamasutra.com/features/20040204/wagner_01.shtml [retrieved on Sep. 10, 2007], 11 pages.
Office Action in U.S. Appl. No. 17/856,895, dated Mar. 12, 2024.
International Search Report and Written Opinion of the International Searching Authority issued in International Application No. PCT/US2023/036609, mailed Feb. 12, 2024 (15 pages).
International Search Report and Written Opinion of the International Searching Authority issued in International Application No. PCT/US2023/079518, mailed Feb. 9, 2024 (12 pages).
Notice of allowance in U.S. Appl. No. 17/504,299, dated Apr. 15, 2024.
Notice of allowance in U.S. Appl. No. 17/856,895, dated Apr. 16, 2024.
Notice of allowance in U.S. Appl. No. 18/076,146, dated Apr. 15, 2024.
Notice of allowance in U.S. Appl. No. 18/086,103, dated Mar. 25, 2024.
Notice of allowance in U.S. Appl. No. 18/086,103, dated Apr. 3, 2024.
Office Action in U.S. Appl. No. 17/504,260, dated Mar. 21, 2024.
Office Action in U.S. Appl. No. 17/504,299, dated Mar. 22, 2024.
Office Action in U.S. Appl. No. 18/195,152, dated Mar. 26, 2024.
Office Action in U.S. Appl. No. 18/405,077, dated May 7, 2024.
International Search Report and Written Opinion of the International Searching Authority issued in International Application No. PCT/US2023/036567, mailed Mar. 11, 2024 (18 pages).
International Search Report and Written Opinion of the International Searching Authority issued in International Application No. PCT/US2023/081101, mailed Mar. 11, 2024 (19 pages).
International Search Report and Written Opinion of the International Searching Authority issued in International Application No. PCT/US2024/010404, mailed Apr. 24, 2024 (16 pages).
Bluetooth Special Interest Group: "Bluetooth Human Interface Devie (HID) Profile Specifications", Bluetooth Adopted Spesifification Web page, Feb. 21, 2012 (Feb. 21, 2012), pp. 1-123, XP055133797, Retrieved from the Internet: URL:https://www.bluetooth.org/en-us-specification/adopted-specifications [retrieved on Aug. 7, 2014].
U.S. Appl. No. 18/746,611 filed Jun. 2024, Ivan Torres.
U.S. Appl. No. 18/734,411 filed Jun. 2024, Maker.
U.S. Appl. No. 18/739,527 filed Jun. 2024, Hong Tai Wei.
U.S. Appl. No. 18/777,919 filed Jul. 2024, Khaira et al..
U.S. Appl. No. 18/805,902 filed Aug. 2024, Khaira et al..
Notice of allowance in U.S. Appl. No. 17/504,283, dated May 29, 2024.
Notice of allowance in U.S. Appl. No. 17/504,299, dated Jun. 12, 2024.
Notice of allowance in U.S. Appl. No. 17/856,895, dated Jun. 12, 2024.
Notice of allowance in U.S. Appl. No. 18/076,146, dated Jun. 13, 2024.
Notice of allowance in U.S. Appl. No. 18/076,146, dated Jul. 22, 2024.
Notice of allowance in U.S. Appl. No. 18/086,103, dated May 28, 2024.
Notice of allowance in U.S. Appl. No. 18/086,103, dated Jul. 9, 2024.
Notice of allowance in U.S. Appl. No. 18/195,152, dated Jul. 23, 2024.

(56) References Cited

OTHER PUBLICATIONS

Notice of allowance in U.S. Appl. No. 18/224,508, dated Jun. 21, 2024.
Office Action in U.S. Appl. No. 17/504,260, dated Jul. 23, 2024.
International Search Report and Written Opinion of the International Searching Authority issued in International Application No. PCT/US2024/019901, mailed Jul. 17, 2024 (15 pages).
International Search Report and Written Opinion of the International Searching Authority issued in International Application No. PCT/US2024/079521, mailed May 24, 2024 (15 pages).
Anonymous: "Using the wireless controller", Playstation 4 User's Guide, Mar. 15, 2023 (Mar. 15, 2023), pp. 1-3, XP093178521, Retrieved from the Internert: URL:https:///web.archive.org/web/20230315012624/https://manuals.playstation.net/document/en/ps4/basic/usercontroller.html [retrieved on Jun. 5, 2024], 3 pages.

\* cited by examiner

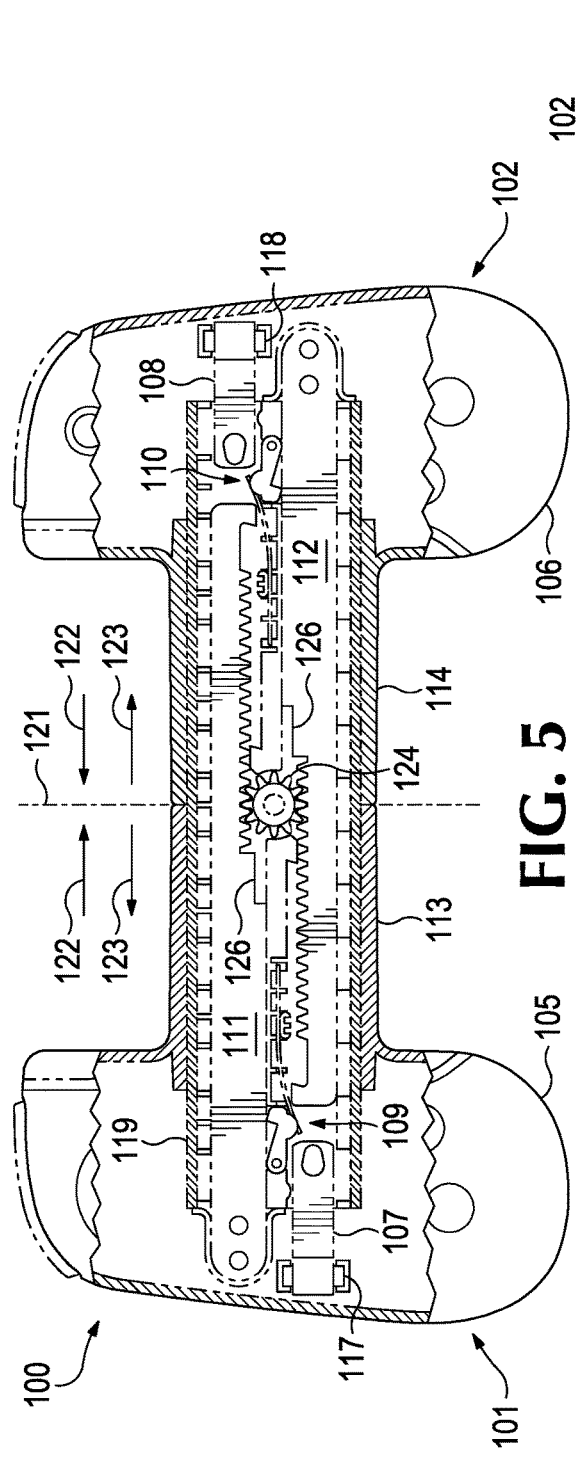
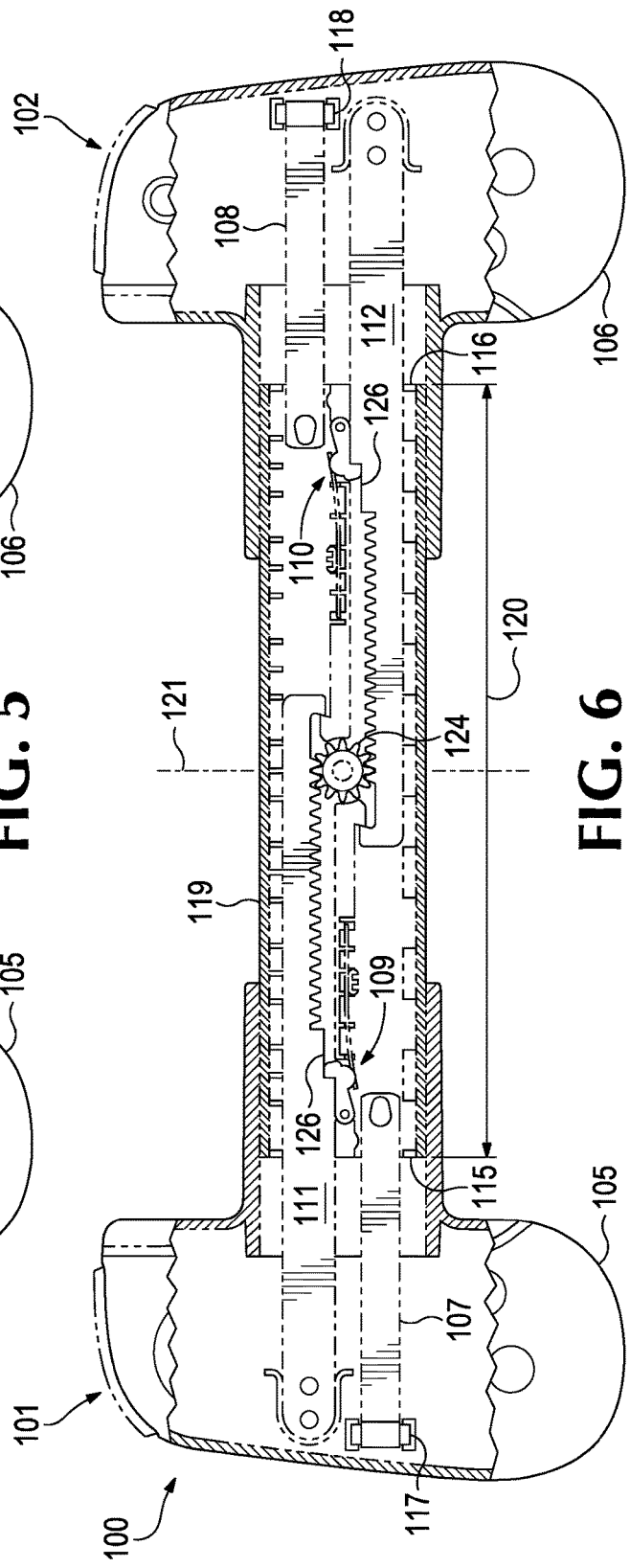

GAME CONTROLLER FOR A MOBILE DEVICE WITH EXTENDED BUMPER BUTTON

CROSS-REFERENCE TO RELATED APPLICATIONS

This patent application is a continuation-in-part of U.S. patent application Ser. No. 16/808,339, filed Mar. 3, 2020, which is incorporated into the present disclosure by this reference.

TECHNICAL FIELD

The subject matter is related to an apparatus and methods for a game controller for a mobile device.

BACKGROUND

A game controller is a device used to provide input to a video game, for example to control an object or character in the video game. The video game may be running on a computer, a specially designed gaming system, or a mobile device. In some prior art devices, the game controller is designed to mechanically couple to a mobile device.

Configurations of the disclosed technology address shortcomings in the prior art.

BRIEF DESCRIPTION OF THE DRAWINGS

FIG. 5 is a front, partial sectional view of the game controller of FIG. 1 in an example of a retracted configuration of the game controller.

FIG. 6 is a front, partial sectional view of the game controller of FIG. 1 in an example of an extended configuration of the game controller.

DETAILED DESCRIPTION

As described in this disclosure, aspects are directed to a game controller for a mobile device with a hold-open feature.

Keeping the handles pulled apart while inserting the mobile device into a game controller can be difficult. For example, a user holding a mobile device in the user's right hand may need to use the user's left hand to pull the two handles apart when placing the mobile device between the two handles of the game controller. This difficulty with insertion may be exacerbated when the game controller connects to the mobile device via a connector, such as USB-C connector, because the user must also ensure that the mobile device is aligned with the connector when inserting it. The removal of the mobile device may be equally vexing as the user must once again attempt to pull the two handles apart with one hand.

But in embodiments of the disclosed game controller, once the handles are pulled apart sufficiently, the handles lock in place, allowing the user to easily insert the mobile device. Then, by applying light pressure on the handles, the user can unlock the handles and snap the device shut, securing the mobile device to the game controller.

With regard to terminology used in this disclosure, it is noted that the "first" and "second" designation is largely arbitrary, meaning, for example, that the choice of which of the two handles is the "first handle" and which is the "second handle" is not critical unless the context requires otherwise. Hence, while the drawings illustrate the second handle 102 as being on the right side of the game controller 100 and the first handle 101 as being on the left side of the game controller 100, it could also be that the handle designated as being the second handle 102 is on the left side of the game controller 100 and the handle designated as being the first handle 101 is on the right side of the game controller 100. For that reason, features that are described in this Detailed Description as being on the "second handle," for example, may be claimed as being on the "first handle" to avoid the potentially confusing situation of reciting a "second" without a "first."

Figure 1:
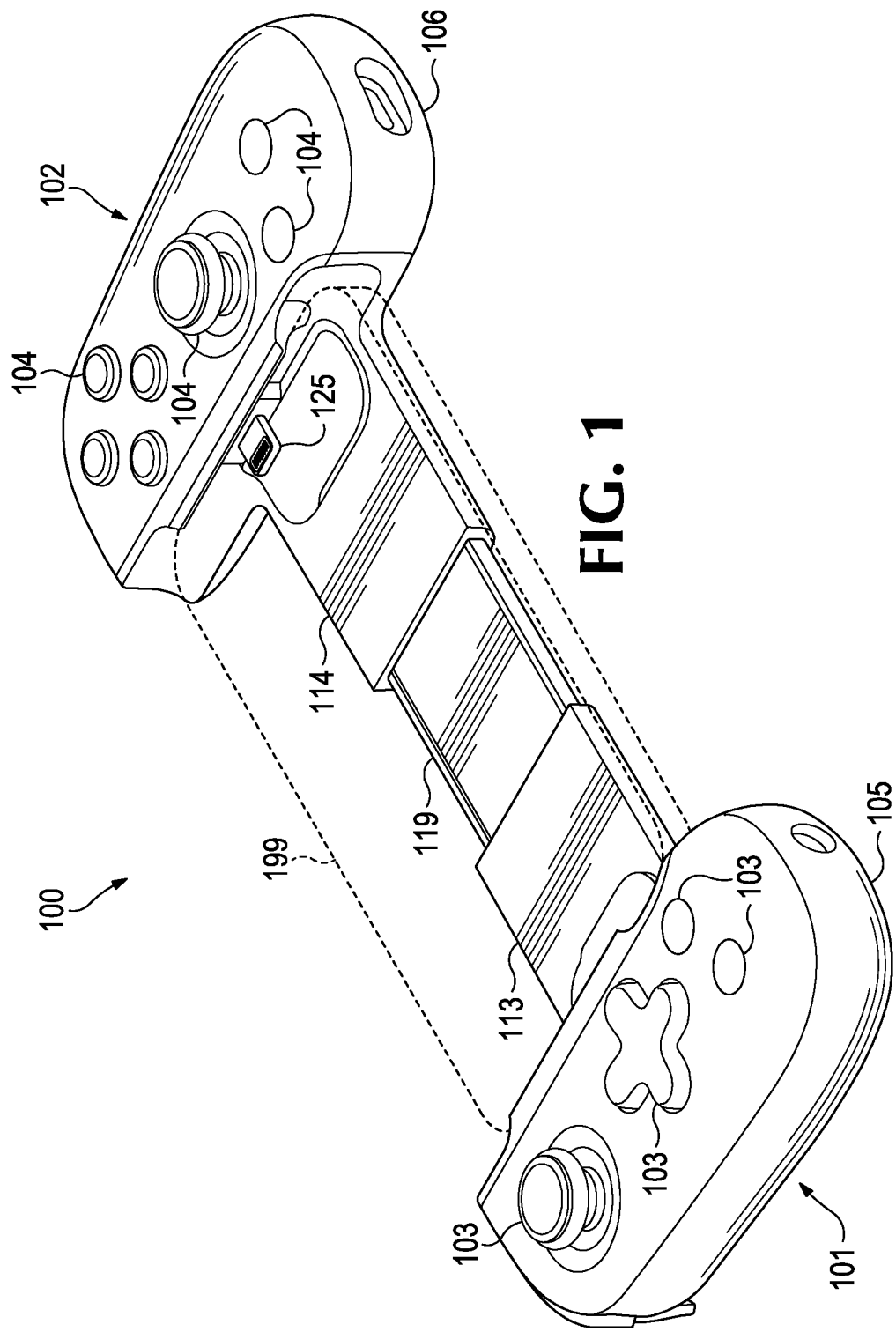
FIG. 1 is a perspective view of a game controller, according to embodiments.

FIG. 1 is a perspective view showing portions of a game controller 100, according to embodiments. As illustrated in FIG. 1, a game controller 100 may include a first handle 101, a second handle 102, and a bridge 119. Each of the first handle 101 and the second handle 102 is configured to contact and support a mobile device 199, though not all contemplated embodiments will include the second handle 102. An exemplary mobile device 199 is shown in broken lines to illustrate how the game controller 100 may contact and support a mobile device 199 in some embodiments. The mobile device 199 may be, as examples, a smartphone or a tablet computer.

As illustrated in FIG. 1, the first handle 101 includes a guide portion 113 and a main body portion 105. The guide portion 113 extends from the main body portion 105 and along a first end 115 of the span 120 of the bridge 119. (See also FIGS. 5 and 6.) The guide portion 113 of the first handle 101 is configured to align the bridge 119 with the main body portion 105 of the first handle 101.

As illustrated, the first handle 101 includes a user-accessible, first hardware interface 103 on the main body portion 105 of the first handle 101. The first hardware interface 103 could be a button, an analog stick, a touchscreen, a touchpad, a knob, a slider, a switch, a wheel, a dial, a directional pad, or another such feature configured to accept touch inputs from a user's finger or a stylus. As shown in FIG. 1, the first hardware interface 103 may include multiple such hardware interfaces.

Likewise, the second handle 102 includes a guide portion 114 and a main body portion 106. The guide portion 114 extends from the main body portion 106 and along a second end 116 of the span 120 of the bridge 119. (See also FIGS. 5 and 6.) The guide portion 114 of the second handle 102 is configured to align the bridge 119 with the main body portion 106 of the second handle 102.

As illustrated, the second handle 102 further includes a user-accessible, second hardware interface 104 on the main body portion 106 of the second handle 102. As above for the first hardware interface 103 of the first handle 101, the second hardware interface 104 could be a button, an analog stick, a touchscreen, a touchpad, a knob, a slider, a switch, a wheel, a dial, a directional pad, or another such feature configured to accept touch inputs from a user's finger or a stylus. The second hardware interface 104 may include multiple such hardware interfaces, as illustrated in FIG. 1.

One or both of the first handle 101 and the second handle 102 may include a connector 125 for physical and electrical connection to the mobile device 199. The connector 125 may be, for example, a USB-C connector.

Figure 2:
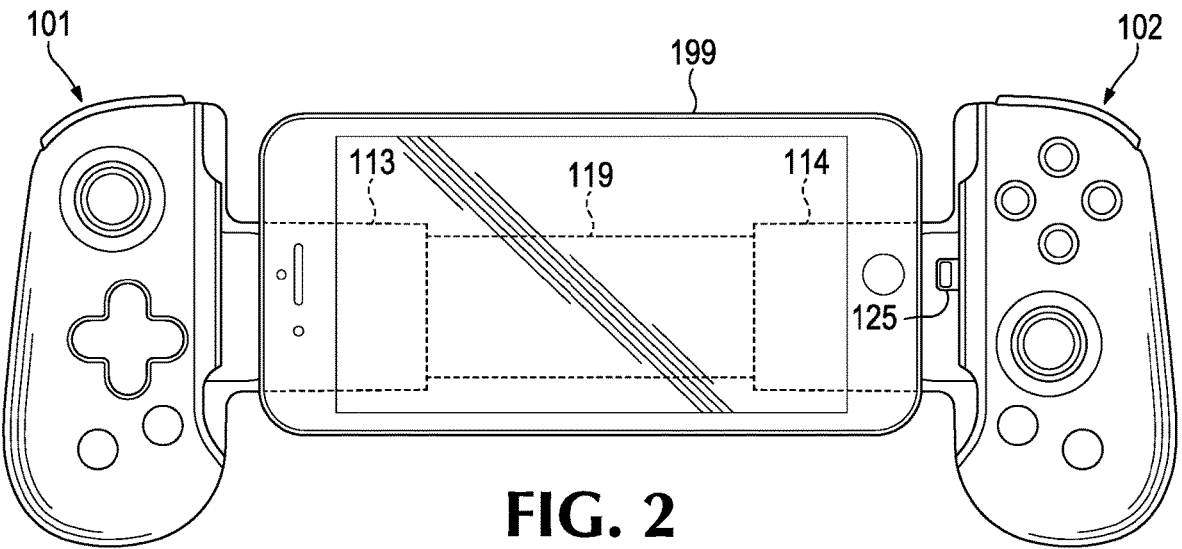
FIGS. 2-4 are each top views of the game controller of FIG. 1, collectively showing an example process of how the game controller may contact and support an example mobile device.
Figure 3:
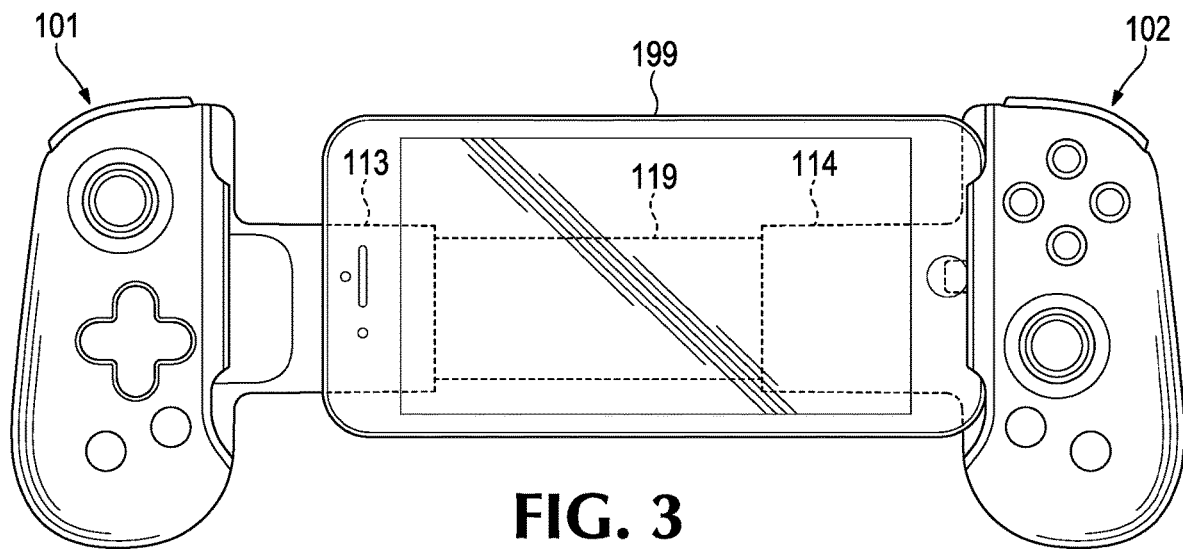
Figure 4:
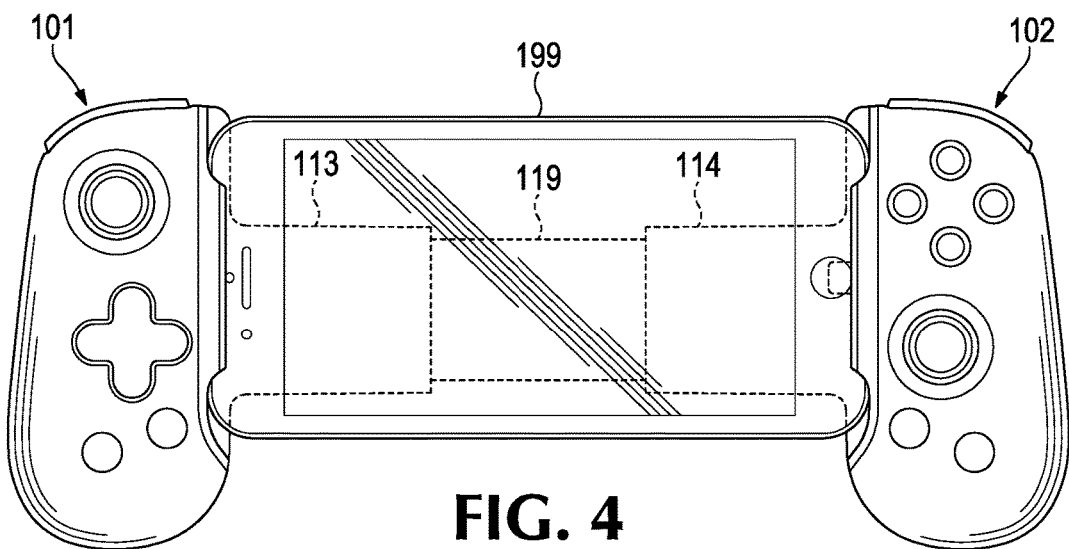

FIGS. 2-4 are top views of the game controller 100 of FIG. 1, showing an example process of how the game controller 100 may contact and support an example mobile device 199. As illustrated in FIG. 2, the mobile device 199 may be placed over the bridge 119, between the first handle 101 and the second handle 102 of the game controller 100. As illustrated in FIG. 3, the connector 125 of the game controller 100 may be joined with a corresponding connector on the mobile device 199. FIGS. 2 and 3 show examples of an extended configuration of the game controller 100. In FIG. 4, the mobile device 199 is secured between the first handle 101 and the second handle 102 of the game controller 100. FIG. 4 illustrates an example of a retracted configuration of the game controller 100. The extended configuration and the retracted configuration of the game controller 100 will be described in more detail below. The reader will note, though, that there is more than one retracted configuration. For example, FIG. 4 illustrates an example of a retracted configuration when the game controller 100 is securing a mobile device 199. As another example, FIG. 5 (described below) illustrates an example of a retracted configuration when the game controller 100 is not securing a mobile device 199.

FIG. 5 is a front, partial sectional view of the game controller 100 of FIG. 1 in an example of a retracted configuration of the game controller 100. FIG. 6 is a front, partial sectional view of the game controller 100 of FIG. 1 in an example of an extended configuration of the game controller 100. As illustrated in FIGS. 5-6, a game controller 100 may include a first handle 101, a second handle 102, and a bridge 119, each as described above for FIGS. 1-4. In each of FIGS. 5-6, external portions of the first handle 101, the second handle 102, and the bridge 119 are not shown to make certain internal features visible.

As illustrated, the bridge 119 is in sliding engagement with the first handle 101. As illustrated, the bridge 119 is not telescoping, meaning that segments of the bridge 119 do not slide within another segment of the bridge 119 to allow for lengthening or shortening of the bridge 119. The bridge 119 has a span 120 extending away from the main body portion 105 of the first handle 101, and the span 120 has a transverse midline 121.

The bridge 119 and the first handle 101 are configured to allow the main body portion 105 of the first handle 101 to translate in a retraction direction 122 toward the midline 121 of the bridge 119 and into a retracted configuration, such as one of the example retracted configurations illustrated in FIG. 4 or 5. The bridge 119 and the first handle 101 are configured to allow the main body portion 105 of the first handle 101 to also translate in an extension direction 123 away from the midline 121 of the bridge 119 into an extended configuration, such as one of the example extended configurations illustrated in FIG. 2 or 6.

As used in this disclosure, the transverse midline 121 of the bridge 119 is a reference datum used to define the extension direction 123 and the retraction direction 122. That is, the retraction direction 122 is toward the transverse midline 121, while the retraction direction 122 is away from the transverse midline 121. Accordingly, the transverse midline 121 of the bridge 119 may or may not coincide with a physical structure on the game controller 100.

Likewise, the bridge 119, as illustrated, is in sliding engagement with the second handle 102, and the span 120 of the bridge 119 extends away from the main body portion 106 of the second handle 102. The bridge 119 and the second handle 102 are configured to allow the main body portion 106 of the second handle 102 to translate in the retraction direction 122 toward the midline 121 of the bridge 119 and into the retracted configuration. The bridge 119 and the second handle 102 are configured to allow the main body portion 106 of the second handle 102 to also translate in the extension direction 123 away from the midline 121 of the bridge 119 into the extended configuration.

As illustrated in FIGS. 5-6, the game controller 100 may also include a first spring mechanism 107, a second spring mechanism 108, a first latch mechanism 109, a second latch mechanism 110, a first linear rack 111, a second linear rack 112, and a pinion 124. These are described below.

The first spring mechanism 107 is configured to bias the first handle 101 toward the retracted configuration. In addition, the first spring mechanism 107 exerts a first retraction force on the first latch mechanism 109 in the retraction direction 122. As illustrated, the first spring mechanism 107 may be attached to the first handle 101 through a shaft 117 and is also attached to the bridge 119. The first spring mechanism 107 may be or include a first constant-load spring connecting the first handle 101 to the bridge 119. The first constant-load spring is configured to exert a substantially constant force on the first handle 101 in the retraction direction 122. As used in this disclosure, "substantially constant" means largely or essentially invariable, yet without requiring perfect constancy, as the game controller 100 transitions from the retracted configuration to the extended configuration and from the extended configuration to the retracted configuration.

The second spring mechanism 108 is configured to bias the second handle 102 toward the retracted configuration. In addition, the second spring mechanism 108 exerts a second retraction force on the second latch mechanism 110 in the retraction direction 122. As illustrated, the second spring mechanism 108 is attached to the second handle 102 through a shaft 118 and is also attached to the bridge 119. The second spring mechanism 108 may be or include a second constant-load spring connecting the second handle 102 to the bridge 119. The second constant-load spring is configured to exert a substantially constant force on the second handle 102 in the retraction direction 122.

The first latch mechanism 109 is configured to temporarily lock the bridge 119 in the extended configuration. The first latch mechanism 109 is further configured to require a first disengagement force in the retraction direction 122 to unlock the bridge 119 from the extended configuration. The first disengagement force is greater than the first retraction force exerted by the first spring mechanism 107 in the retraction direction 122. The additional force (that is, that portion of the first disengagement force that exceeds the first retraction force) may be provided by, for example, pressure from the user's hands exerted in the retraction direction 122.

Likewise, the second latch mechanism 110 is configured to temporarily lock the bridge 119 in the extended configuration. The second latch mechanism 110 is further configured to require a second disengagement force in the retraction direction 122 to unlock the bridge 119 from the extended configuration. The second disengagement force is greater than the second retraction force exerted by the second spring mechanism 108 in the retraction direction 122. The additional force (that is, that portion of the second disengagement force that exceeds the second retraction force) may be provided by, for example, pressure from the user's hands exerted in the retraction direction 122.

As illustrated, the first linear rack 111 is coupled to the first handle 101 and is in sliding engagement with the bridge 119. The first linear rack 111 extends substantially along the span 120 of the bridge 119. As used in this disclosure, "substantially along" means largely or essentially in the direction of, without requiring perfect conformity. The first linear rack 111 may further include a step 126 or indentation, which may engage with the first latch mechanism 109 as described more fully below. As used in this disclosure, "to engage" means "to interlock with; to fit together."

The second linear rack 112 is coupled to the second handle 102 and is in sliding engagement with the bridge 119. The second linear rack 112 extends substantially along the span 120 of the bridge 119. The second linear rack 112 may further include a step 126, which may engage with the second latch mechanism 110 as described more fully below.

As illustrated, the pinion 124 is affixed to the bridge 119. The pinion 124 is in contact with each of the first linear rack 111 and the second linear rack 112. The pinion 124 is configured to rotate relative to the bridge 119 as the first linear rack 111 is translated relative to the pinion 124. The pinion 124 is also configured to rotate as the second linear rack 112 is translated relative to the pinion 124.

Figure 7:
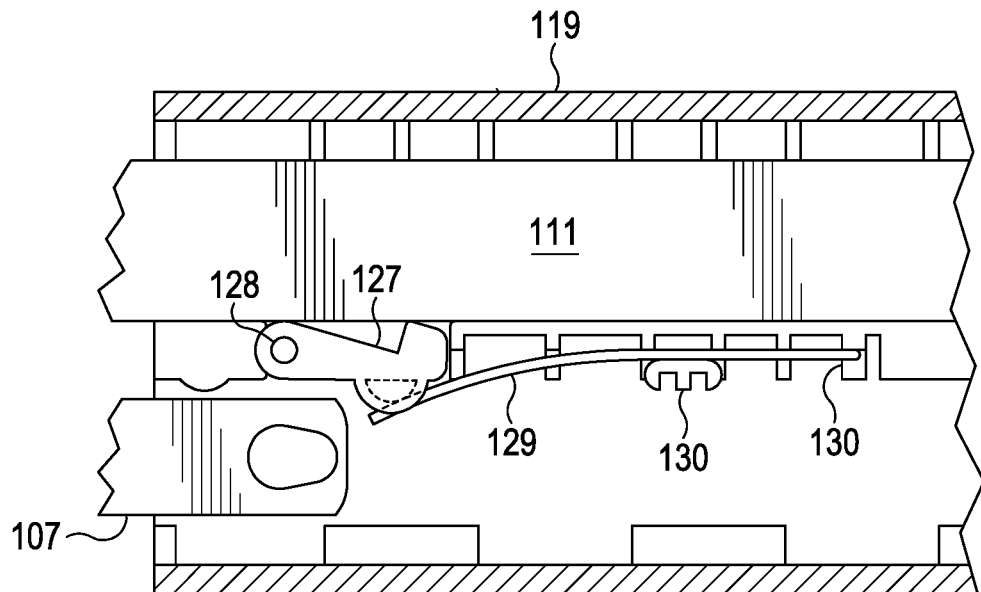
FIG. 7 is a close-up of a portion of the game controller of FIGS. 5 and 6, illustrating an example latch mechanism in an unlatched configuration.
Figure 8:
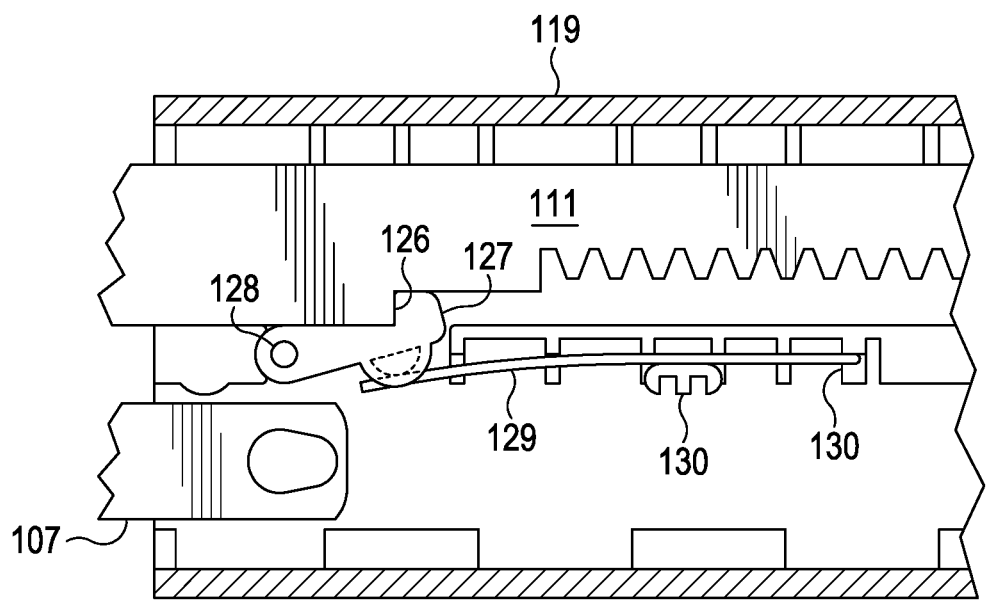
FIG. 8 is a close-up of a portion of the game controller of FIGS. 5 and 6, illustrating the example latch mechanism of FIG. 7 in a latched configuration.

FIG. 7 is a close-up of a portion of the game controller 100 of FIGS. 5 and 6, illustrating an example latch mechanism in an unlatched configuration. FIG. 8 is a close-up of a portion of the game controller 100 of FIGS. 5 and 6, illustrating the example latch mechanism of FIG. 7 in a latched configuration. While illustrated and described for the first-handle side of the game controller 100, the discussion for FIGS. 7 and 8 applies equally to the second-handle side of the game controller 100. Hence, the example latch mechanism of FIGS. 7 and 8 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 7 and 8, the example latch mechanism may include a catch 127 coupled to the bridge 119. The catch 127 is configured to contact and engage the step 126 on the first linear rack 111 in the extended configuration and disengage from the step 126 on the first linear rack 111 in the retracted configuration. To facilitate the engagement and disengagement of the catch 127 from the step 126, the step 126 may be angled or rounded, or a portion of the catch 127 facing the step 126 may be angled or rounded, or both.

As illustrated, the catch 127 is coupled to the bridge 119 through a pivot 128. The first latch mechanism 109 may also include a cantilevered spring 129 configured to apply a torque to the catch 127 about the pivot 128 to bias the catch 127 against the first linear rack 111. The cantilevered spring 129 may be coupled to the bridge 119 by one or more attachment points 130.

With particular reference to FIGS. 2-8, in use the game controller 100 may initially be in a retracted configuration, such as the retracted configuration illustrated in FIG. 5. In the retracted configuration, the catch 127 is disengaged from the step 126 on the first linear rack 111. In versions having a catch 127 on a second linear rack 112 (also or instead of the catch 127 on the first linear rack 111), in the retracted configuration, the catch 127 is disengaged from the step 126 on the second linear rack 112.

Then, the user may apply a force (using, for example, the user's hands) to the first handle 101 or the second handle 102, or both, in the extension direction 123 to move the game controller 100 into an extended configuration, such as the extended configurations illustrated in FIGS. 1, 2, and 6. In other words, the user may pull the first handle 101 and the second handle 102 apart from each other.

In transitioning to the extended configuration, the first linear rack 111 slides relative to the catch 127 for the first end 115 of the span 120 until that catch 127 is aligned with the step 126 in the first linear rack 111. During the transition, the first spring mechanism 107 continues to bias the first handle 101 toward the retracted configuration and exerts a first retraction force on the first latch mechanism 109 in the retraction direction 122. The cantilevered spring 129 then causes the catch 127 for the first end 115 of the span 120 to engage the step 126 of the first linear rack 111 by forcing the catch 127 into the step 126. The first latch mechanism 109 is now temporarily locking the bridge 119 in the extended configuration by way of the catch 127.

In versions having a catch 127 on a second linear rack 112 (also or instead of the catch 127 on the first linear rack 111), in transitioning to the extended configuration, the second linear rack 112 slides relative to the catch 127 for the second end 116 of the span 120 until the catch 127 is aligned with the step 126 in the second linear rack 112. During the transition, the second spring mechanism 108 continues to bias the second handle 102 toward the retracted configuration and exerts a second retraction force on the second latch mechanism 110 in the retraction direction 122. The cantilevered spring 129 then causes the catch 127 for the second end 116 of the span 120 to engage the step 126 of the second linear rack 112 by forcing the catch 127 into the step 126. The second latch mechanism 110 is now temporarily locking the bridge 119 in the extended configuration by way of the catch 127.

With the bridge 119 temporarily locked in the extended configuration, the user may then insert a mobile device 199 into the game controller 100 by placing the mobile device 199 over the bridge 119, such as illustrated in FIG. 2. If necessary, the connector 125 of the game controller 100 may then be joined with a corresponding connector on the mobile device 199, such as illustrated in FIG. 3.

To unlock the hold-open feature, where the bridge 119 is temporarily locked in the extended configuration, and return the game controller 100 to a retracted configuration, the user typically applies a force to the first handle 101 in the retraction direction 122. This user-applied force, coupled with the first retraction force exerted by the first spring mechanism 107, causes the catch 127 for the first end 115 of the span 120 to disengage from the step 126 in the first linear rack 111. Once disengaged, the first retraction force exerted by the first spring mechanism 107 causes the game controller 100 to transition to a retracted configuration.

In versions having a catch 127 on a second linear rack 112 (also or instead of the catch 127 on the first linear rack 111), the user may apply a force to the second handle 102 in the retraction direction 122. This user-applied force, coupled with the second retraction force exerted by the second spring mechanism 108, causes the catch 127 for the second end 116 of the span 120 to disengage from the step 126 in the second linear rack 112. Once disengaged, the second retraction force exerted by the second spring mechanism 108 causes the game controller 100 to transition to a retracted configuration.

Since moving the game controller 100 from the retracted configuration to the extended configuration is often done by using both of the user's hands (such as, for example, one hand on each of the first handle 101 and the second handle 102), the hold-open feature allows the user—once the game controller 100 is temporarily locked in the extended configuration—to remove one or both of the user's hands from the game controller 100 (such as, for example, from either the first handle 101 or the second handle 102, or both) to manipulate the mobile device 199 into position, such as the position illustrated in FIG. 2. Hence, embodiments of the disclosed technology allow the user to efficiently and easily insert and remove a mobile device 199 from the game controller 100.

Figure 9:
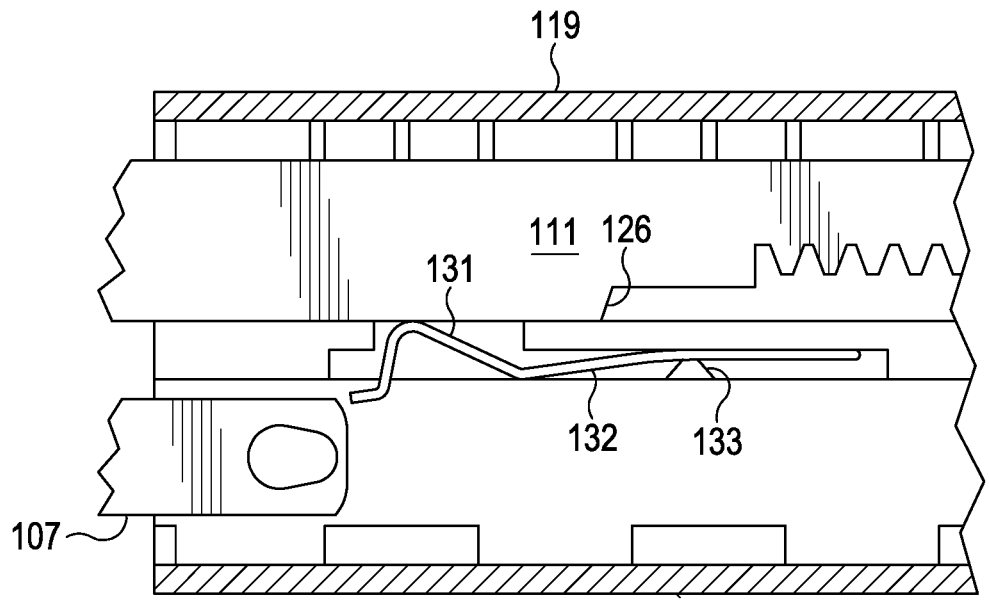
FIG. 9 is a close-up of a portion of a first alternative arrangement for the game controller of FIGS. 5 and 6, illustrating an example latch mechanism in an unlatched configuration.
Figure 10:
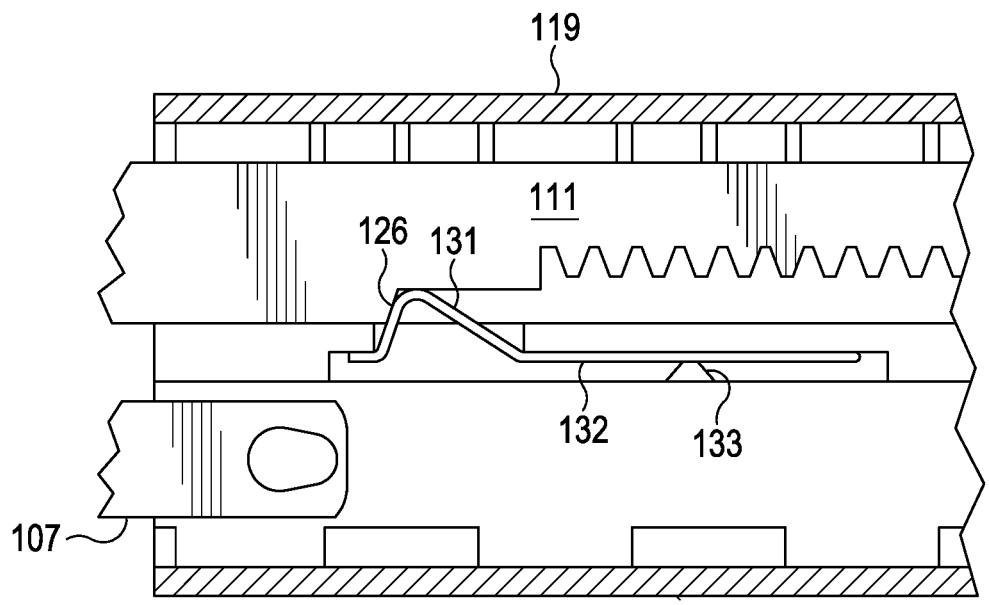
FIG. 10 is a close-up of a portion of a first alternative arrangement for the game controller of FIGS. 5 and 6, illustrating the example latch mechanism of FIG. 9 in a latched configuration.

FIG. 9 is a close-up of a portion of an alternative arrangement for the game controller 100 of FIGS. 5 and 6, illustrating an example latch mechanism in an unlatched configuration. FIG. 10 is a close-up of a portion of an alternative arrangement for the game controller 100 of FIGS. 5 and 6, illustrating the example latch mechanism of FIG. 9 in a latched configuration. While illustrated and described for the first-handle side of the game controller 100, the discussion for FIGS. 9 and 10 applies equally to the second-handle side of the game controller 100. Hence, the example latch mechanism of FIGS. 9 and 10 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 9 and 10, the example latch mechanism may include a tension spring 132 coupled to the bridge 119. An engagement portion 131 of the tension spring 132 is configured to contact and engage the step 126 on the first linear rack 111 in the extended configuration and disengage from the step 126 on the first linear rack 111 in the retracted configuration. To facilitate the engagement and disengagement of the catch 127 from the step 126, the step 126 may be angled or rounded.

As illustrated, the tension spring 132 is coupled to the bridge 119 through one or more attachment points 133. The tension spring 132 is configured to bias the engagement portion 131 of the tension spring 132 against the first linear rack 111. The engagement portion 131 is configured to engage the step 126 in the extended configuration.

Accordingly, in transitioning from the retracted configuration (an example of which is illustrated in FIG. 9) to the extended configuration (an example of which is illustrated in FIG. 10), the first linear rack 111 slides relative to the engagement portion 131 of the tension spring 132 until the engagement portion 131 is aligned with the step 126 in the first linear rack 111. The tension spring 132 then causes the engagement portion 131 to engage the step 126 of the first linear rack 111 by forcing the engagement portion 131 into the step 126. Likewise, in transitioning from the extended configuration to the retracted configuration, the engagement portion 131 of the tension spring 132 is disengaged from the step 126 in the first linear rack 111. Otherwise, operation of this example latch mechanism is substantially as described above for FIGS. 2-8.

Figure 11:
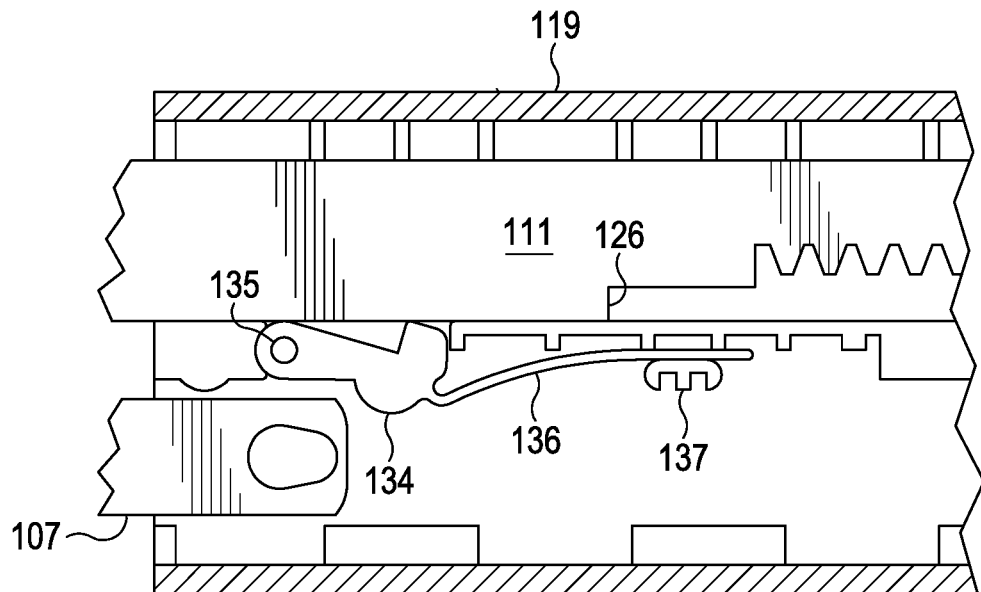
FIG. 11 is a close-up of a portion of a second alternative arrangement for the game controller of FIGS. 5 and 6, illustrating an example latch mechanism in an unlatched configuration.
Figure 12:
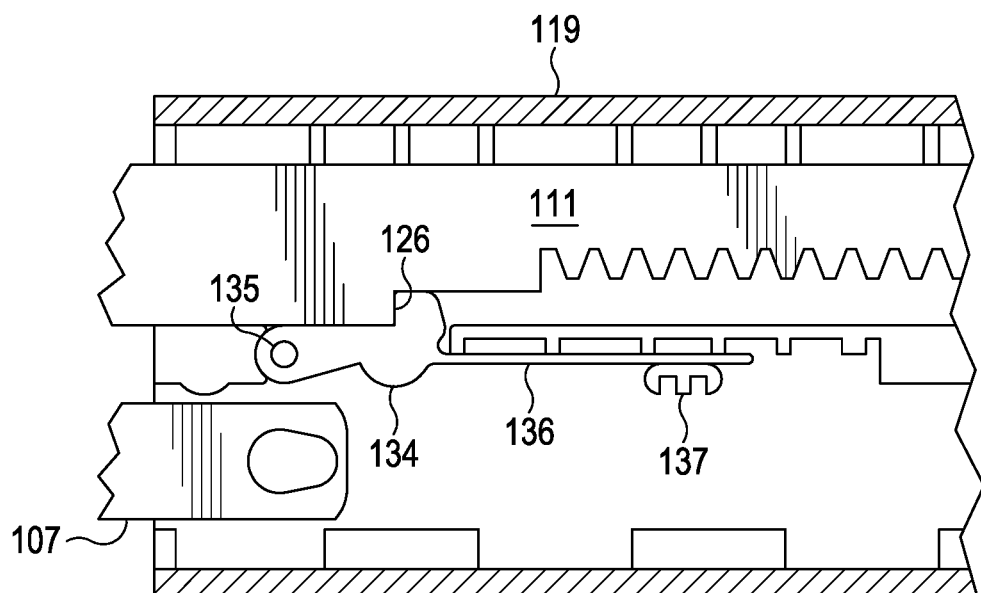
FIG. 12 is a close-up of a portion of a second alternative arrangement for the game controller of FIGS. 5 and 6, illustrating the example latch mechanism of FIG. 11 in a latched configuration.

FIG. 11 is a close-up of a portion of an alternative arrangement for the game controller 100 of FIGS. 5 and 6, illustrating an example latch mechanism in an unlatched configuration. FIG. 12 is a close-up of a portion of an alternative arrangement for the game controller 100 of FIGS. 5 and 6, illustrating the example latch mechanism of FIG. 11 in a latched configuration. While illustrated and described for the first-handle side of the game controller 100, the discussion for FIGS. 11 and 12 applies equally to the second-handle side of the game controller 100. Hence, the example latch mechanism of FIGS. 11 and 12 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 11 and 12, the example latch mechanism may include a catch 134 coupled to the bridge 119. The catch 134 is configured to contact and engage the step 126 on the first linear rack 111 in the extended configuration and disengage from the step 126 on the first linear rack 111 in the retracted configuration. To facilitate the engagement and disengagement of the catch 134 from the step 126, the step 126 may be angled or rounded, or a portion of the catch 134 facing the step 126 may be angled or rounded, or both.

As illustrated, the catch 134 is coupled to the bridge 119 through a pivot 135. The first latch mechanism 109 may also include a cantilevered spring 136 configured to apply a torque to the catch 134 about the pivot 135 to bias the catch 134 against the first linear rack 111. As illustrated, the cantilevered spring 136 may be integral to and extend from the catch 134. Accordingly, the cantilevered spring 136 may be configured to slide through one or more guide points 137 of the bridge 119, which constrain an end of the cantilevered spring 136 opposite the catch 134.

Operation of this example latch mechanism is substantially as described above for FIGS. 2-8.

Figure 13:
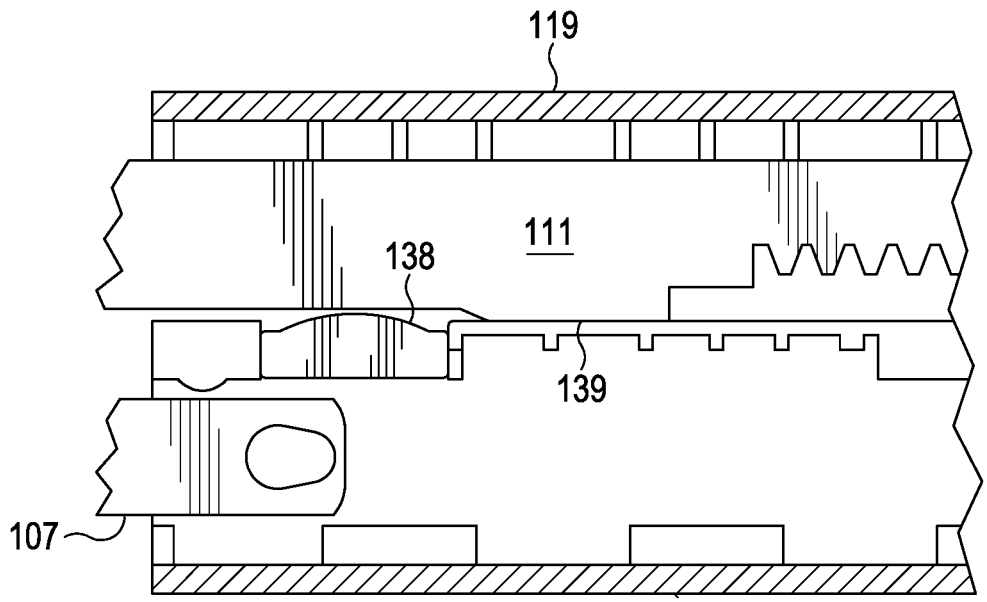
FIG. 13 is a close-up of a portion of a third alternative arrangement for the game controller of FIGS. 5 and 6, illustrating an example latch mechanism in an unlatched configuration.
Figure 14:
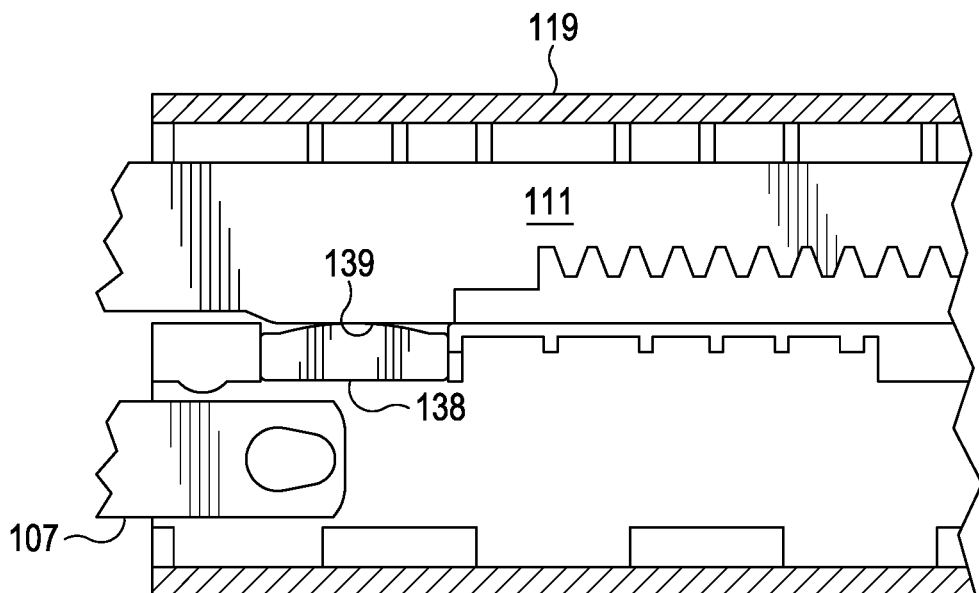
FIG. 14 is a close-up of a portion of a third alternative arrangement for the game controller of FIGS. 5 and 6, illustrating the example latch mechanism of FIG. 13 in a latched configuration.

FIG. 13 is a close-up of a portion of an alternative arrangement for the game controller 100 of FIGS. 5 and 6, illustrating an example latch mechanism in an unlatched configuration. FIG. 14 is a close-up of a portion of an alternative arrangement for the game controller 100 of FIGS. 5 and 6, illustrating the example latch mechanism of FIG. 13 in a latched configuration. While illustrated and described for the first-handle side of the game controller 100, the discussion for FIGS. 13 and 14 applies equally to the second-handle side of the game controller 100. Hence, the example latch mechanism of FIGS. 13 and 14 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 13 and 14, the example latch mechanism may include an elastic body 138 coupled to the bridge 119. The elastic body 138 is configured to contact and frictionally engage a raised portion 139 on the first linear rack 111 in the extended configuration and disengage from the raised portion 139 in the retracted configuration. To facilitate the engagement and disengagement of the elastic body 138 from the raised portion 139, the raised portion 139 may be angled or rounded, or the raised portion 139 may be angled or rounded, or both. As illustrated, the elastic body 138 is configured to elastically distort when engaged with the raised portion 139 of the first linear rack 111.

Accordingly, in transitioning from the retracted configuration (an example of which is illustrated in FIG. 13) to the extended configuration (an example of which is illustrated in FIG. 14), the first linear rack 111 slides relative to the elastic body 138 until the elastic body 138 contacts the raised portion 139 of the first linear rack 111. The elastic body 138 then elastically distorts and frictionally engages the raised portion 139 on the first linear rack 111. Likewise, in transitioning from the extended configuration to the retracted configuration, the elastic body 138 is disengaged from the raised portion 139 of the first linear rack 111. Otherwise, operation of this example latch mechanism is substantially as described above for FIGS. 2-8.

Figure 15:
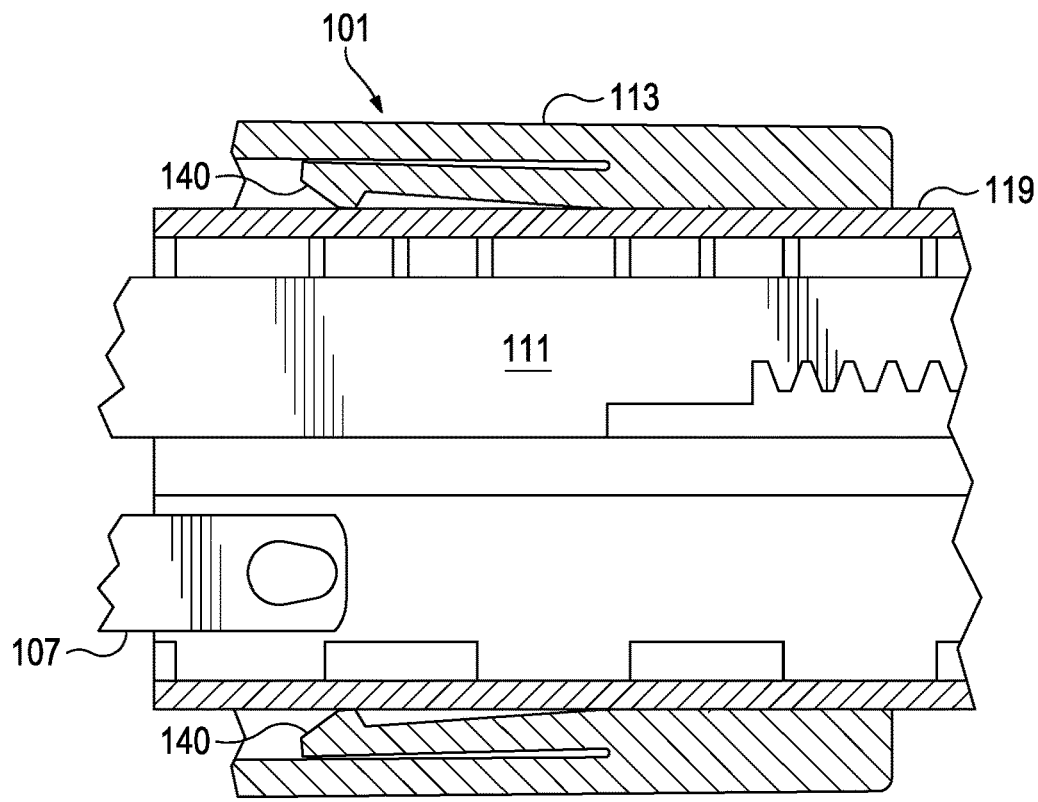
FIG. 15 is a close-up of a portion of a fourth alternative arrangement for the game controller of FIGS. 5 and 6, illustrating an example latch mechanism in an unlatched configuration.
Figure 16:
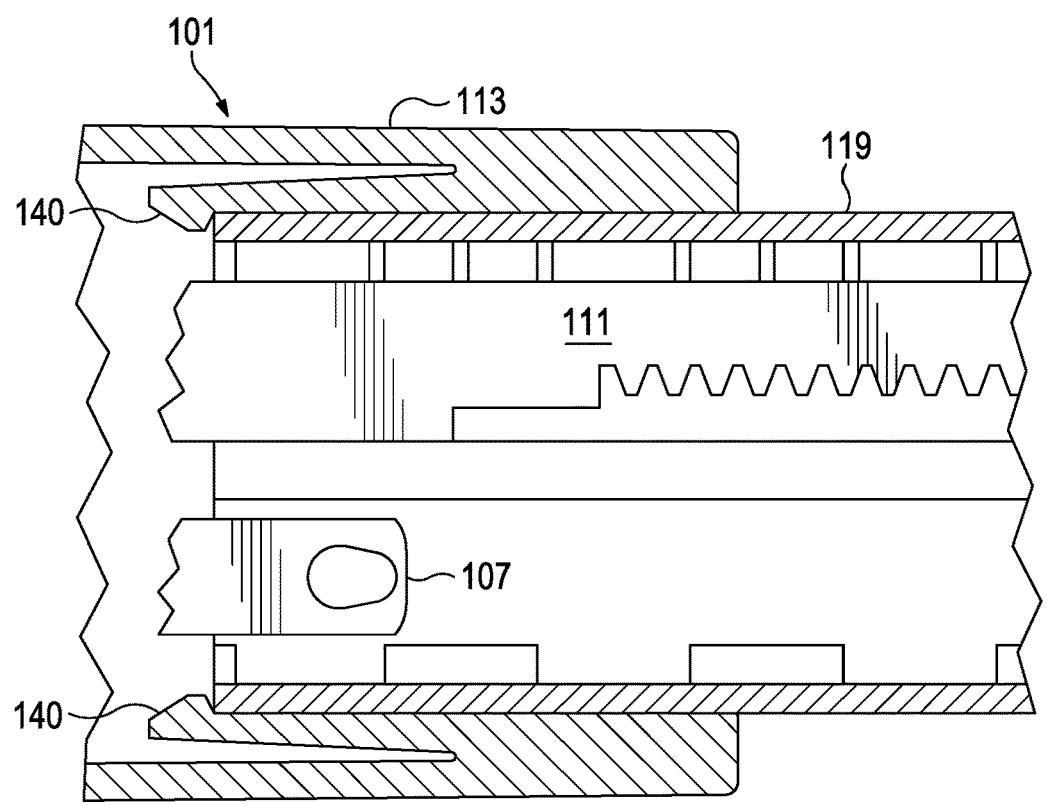
FIG. 16 is a close-up of a portion of a fourth alternative arrangement for the game controller of FIGS. 5 and 6, illustrating the example latch mechanism of FIG. 15 in a latched configuration.

FIG. 15 is a close-up of a portion of an alternative arrangement for the game controller 100 of FIGS. 5 and 6, illustrating an example latch mechanism in an unlatched configuration. FIG. 16 is a close-up of a portion of an alternative arrangement for the game controller 100 of FIGS. 5 and 6, illustrating the example latch mechanism of FIG. 15 in a latched configuration. While illustrated and described for the first-handle side of the game controller 100, the discussion for FIGS. 15 and 16 applies equally to the second-handle side of the game controller 100. Hence, the example latch mechanism of FIGS. 15 and 16 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 15 and 16, the example latch mechanism may include one or more resilient clips 140 on the first handle 101. As illustrated, the resilient clip 140 may be within the guide portion 113 of the first handle 101. The resilient clip 140 is configured to contact and engage an outer edge of the bridge 119 in the extended configuration and to disengage from the outer edge of the bridge 119 in the retracted configuration. To facilitate the engagement and disengagement of the resilient clip 140 from the outer edge of the bridge 119, the resilient clip 140 may be angled or rounded, the outer edge may be angled or rounded, or both. The resilient clip 140 is biased against the outer edge of the bridge 119. As illustrated in FIG. 15, the resilient clips 140 may be disengaged from the outer edge of the bridge 119 while still being in contact with the outer edge.

As illustrated in FIG. 16, the resilient clip 140 engages a terminus of the bridge 119. In other embodiments, the resilient clip 140 may engage an indentation or step on the outer edge of the bridge 119, the indentation or step not being at the terminus of the bridge 119.

Alternatively, one or more resilient clips 140 may be on the bridge 119 and be configured to contact and engage the first handle 101 in the extended configuration and to disengage from the first handle 101 in the retracted configuration.

With specific reference to the embodiment illustrated in FIGS. 15 and 16, in transitioning from the retracted configuration (an example of which is illustrated in FIG. 15) to the extended configuration (an example of which is illustrated in FIG. 16), the bridge 119 slides relative to the first handle 101 until the resilient clip 140 engages the terminus of the bridge 119. Likewise, in transitioning from the extended configuration to the retracted configuration, the resilient clip 140 is disengaged from the terminus of the bridge 119. Otherwise, operation of this example latch mechanism is analogous to what is described above for FIGS. 2-8.

Figure 17:
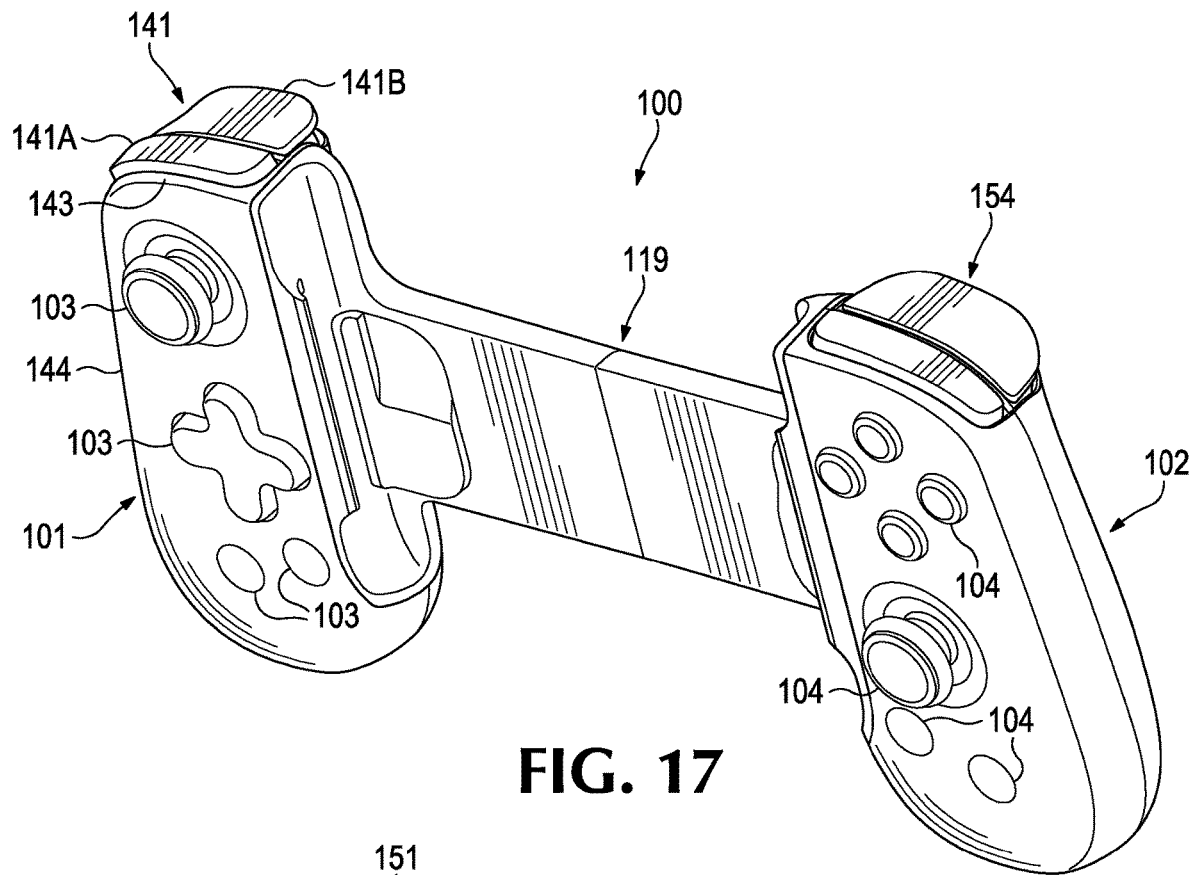
FIG. 17 is an top perspective view of the game controller of FIG. 1.

FIG. 17 is an top perspective view of the game controller 100 of FIG. 1. As illustrated in FIG. 17, the game controller 100 includes the first handle 101, the second handle 102, and the bridge 119, each as discussed above. The configuration illustrated in FIGS. 17-20 may include any or all of the features discussed in this disclosure for other configurations of the game controller 100. In addition, the game controller 100 may include a first bumper 141 coupled to the first handle 101 and a first switch 142 within the first handle 101.

Figure 18:
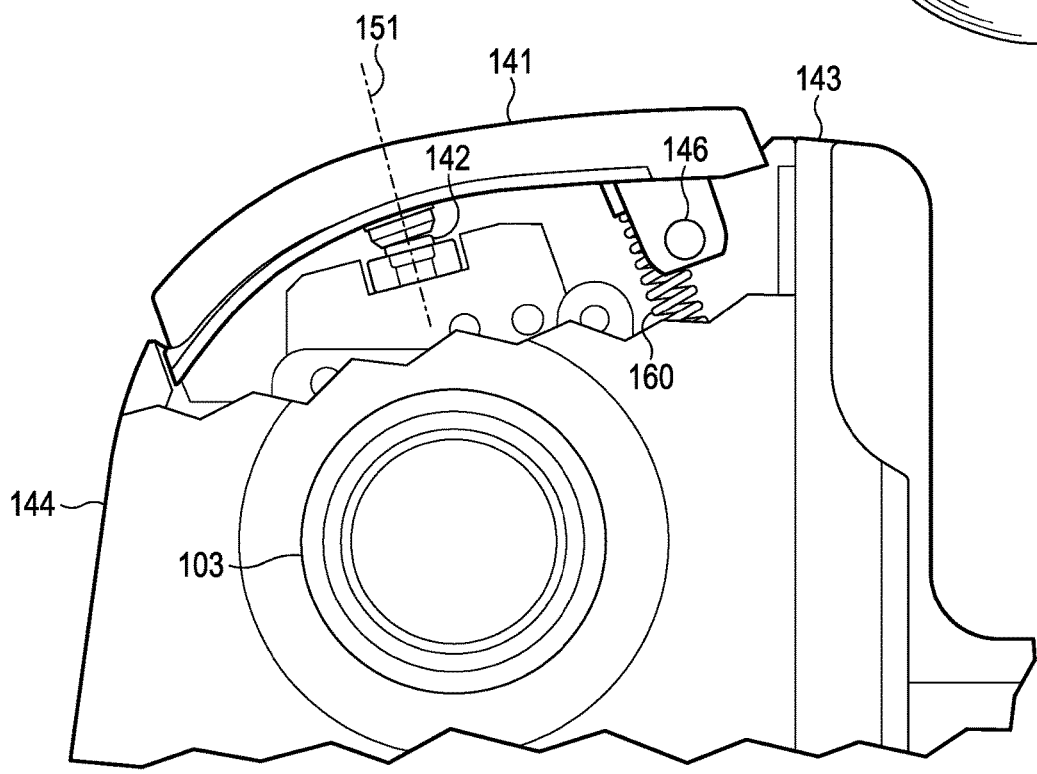
FIG. 18 is a front, detail view of a portion of the game controller of FIG. 17, with portions not shown to make other features clearer and the bumper illustrated in an example of a undepressed condition.
Figure 19:
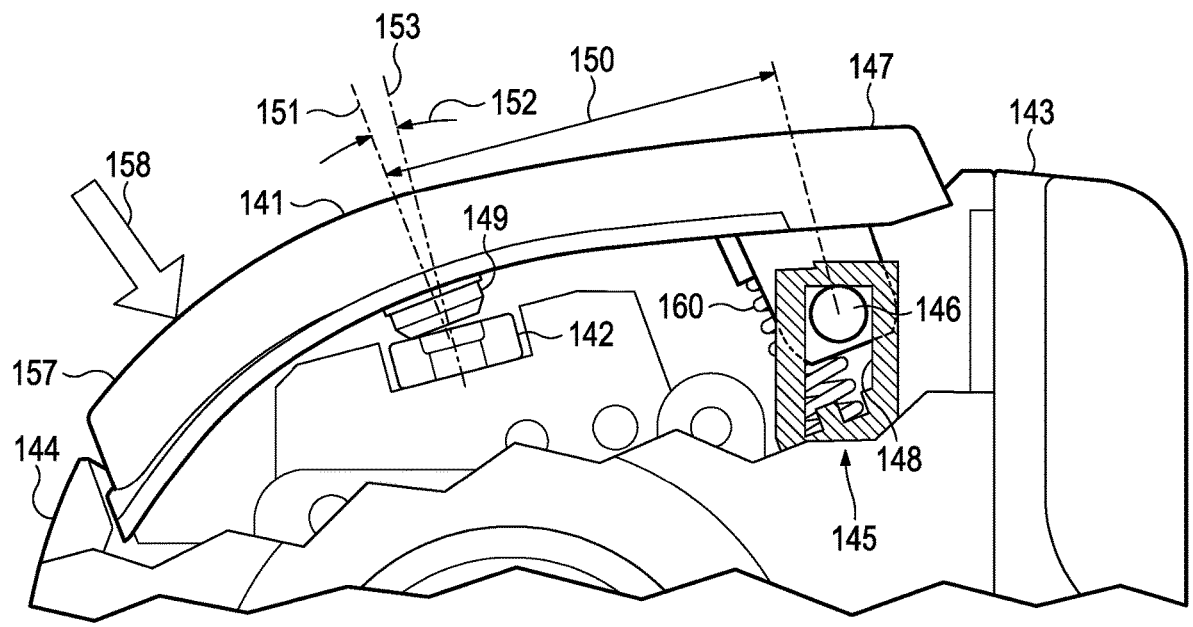
FIG. 19 is a partial cutaway of the game controller of FIG. 18, with the bumper illustrated in an example of a first depressed condition.
Figure 20:
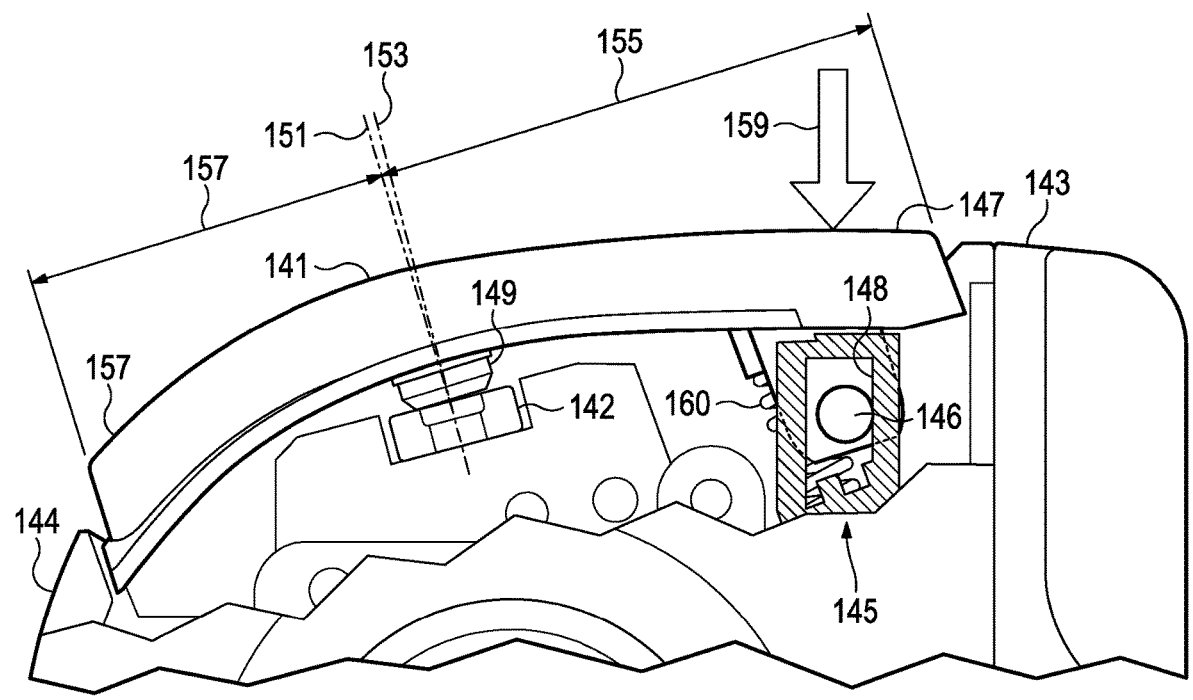
FIG. 20 is a partial cutaway of the game controller of FIG. 18, with the bumper illustrated in an example of a second depressed condition.

FIG. 18 is a front, detail view of a portion of the game controller 100 of FIG. 17, with portions not shown to make other features clearer. In addition, the bumper 141 is illustrated in an example of a undepressed condition. FIG. 19 is a partial cutaway of the game controller 100 of FIG. 18, with the bumper 141 illustrated in an example of a first depressed condition. FIG. 20 is a partial cutaway of the game controller 100 of FIG. 18, with the bumper 141 illustrated in an example of a second depressed condition. As illustrated, the bumper 141 may be biased, such as by spring 160, in the undepressed condition.

With reference to FIGS. 17-20, the first bumper 141 is a configuration of the user-accessible, first hardware interface that is discussed above. Accordingly, the first bumper 141 may coexist with one or more other buttons, analog sticks, touchscreens, touchpads, knobs, sliders, switches, wheels, dials, directional pads, or other such features configured to accept touch inputs from a user's finger or a stylus.

As illustrated, the first bumper 141 may be at an outer edge 143, 144 of the main body portion 105 of the first handle 101. For example, the first bumper 141 may be at a top edge 143 of the main body portion 105 of the first handle 101. In configurations, the first bumper 141 may extend from the top edge 143 of the main body portion 105 of the first handle 101 to a side edge 144 of the main body portion 105 of the first handle 101, an example of which is illustrated in the drawings. This may allow, for example, user's with shorter fingers to be able to reach the first bumper 141 when holding the first handle 101 as in typical use. As illustrated, the first bumper 141 may include a first portion 141A and a second portion 141B, each of the first portion 141A and the second portion 141B being independently operable bumpers, and each operating as described here.

The first bumper 141 is configured to accept touch inputs from a user. Hence, for example the user might depress the first bumper 141 with the user's index finger or middle finger.

As illustrated, the first bumper 141 may be coupled to the first handle 101 through a dual-action coupling 145 that is configured to both rotate and translate relative to the first handle 101. As illustrated, the first bumper 141 includes a pivot rod 146 at a first end 147 of the first bumper 141. The pivot rod 146 is configured to engage a track slot 148 of the first handle 101. The pivot rod 146 is configured to rotate within the track slot 148 and to translate within the track slot 148. (This is explained more fully below with regard to FIGS. 19 and 20.) As illustrated, the first bumper 141 further includes a plunger 149 at a first-span distance 150 from the pivot rod 146.

The first switch 142 is configured to be activated and deactivated by touch inputs to the first bumper 141. In configurations, the first switch 142 may be or include a tactile switch. The plunger 149 of the first bumper 141 is configured to contact and impart a force to the first switch 142.

As illustrated, a centerline 151 of the plunger 149 of the first bumper 141 may be at a contact angle 152 to a centerline 153 of the first switch 142. The contact angle 152 is acute and non-zero. Preferably, the contact angle 152 is between about five degrees and about thirty-five degrees. More preferably, the contact angle 152 is between about ten degrees and about twenty-five degrees. Even more preferably, the contact angle 152 is about twenty degrees.

It is noted that the description for a second bumper 154 coupled to the second handle 102 and a second switch within the second handle 102 is substantially as described above for the first bumper 141 coupled to the first handle 101 and a first switch 142 within the first handle 101, except for replacing "first" with "second" for those terms. Hence, to avoid unnecessary repetition, which may be confusing, that description is not repeated here. In addition, the remaining description for FIGS. 19 and 20 does not include the "first" or "second" terminology for the handle, bumper, or switch, which instead use the reference numbers for the first handle 101, the first bumper 141, and the first switch 142. Accordingly, the following description is meant to apply equally to the "first" and "second" sides of the game controller 100.

As noted above, FIG. 19 shows the bumper 141 illustrated in an example of a first depressed condition. The bumper 141 may conceptually be divided into two segments. A first span 155 is between the centerline of the plunger 151 and the first end 147 of the bumper 141. A second span 156 is between the centerline of the plunger 151 and a second end 157 of the bumper 141. The second end 157 of the bumper 141 is opposite the first end 147 of the bumper 141. As illustrated in FIG. 19, a force may be applied at a second-span force-application point 158. It is noted that the location of the second-span force-application point 158 illustrated in FIG. 19 is one example location, and the second-span force-application point 158 could be anywhere along the second span 156 of the bumper 141.

As illustrated in FIG. 19, application of a force at the second-span force-application point 158 causes the second span 156 of the bumper 141 to depress, and this causes the pivot rod 146 to rotate within the track slot 148. From the perspective illustrated in FIG. 19, the rotation is counterclockwise. The rotation of the bumper 141 about the pivot rod 146 causes the plunger 149 to push against the switch 142, thereby imparting a force to the switch 142.

As illustrated in FIG. 20, a force may be applied at a first-span force-application point 159. It is noted that the location of the first-span force-application point 159 illustrated in FIG. 20 is one example location, and the first-span force-application point 159 could be anywhere along the first span 155 of the bumper 141.

As illustrated in FIG. 20, application of a force at the first-span force-application point 159 causes the first span 155 of the bumper 141 to depress, and this causes the pivot rod 146 to translate within the track slot 148. From the perspective illustrated in FIG. 20, the translation is in the same direction as the arrow denoting the force applied at the first-span force-application point 159. The translating of the pivot rod 146 causes the plunger 149 to push against the switch 142, thereby imparting a force to the switch 142.

EXAMPLES

Illustrative examples of the disclosed technologies are provided below. A particular configuration of the technologies may include one or more, and any combination of, the examples described below.

Example 1 includes a game controller for a mobile device, the game controller comprising: a first handle configured to contact and support a mobile device; a first bumper coupled to the first handle, the first bumper configured to accept touch inputs from a user, the first bumper including a pivot rod at a first end of the first bumper and configured to engage a track slot of the first handle, the pivot rod configured to rotate within the track slot and to translate within the track slot, the first bumper further including a plunger at a first-span distance from the pivot rod; and a first switch within the first handle, the first switch configured to be activated by touch inputs to the first bumper, the plunger of the first bumper configured to contact and impart a force to the first switch.

Example 2 includes the game controller of Example 1, in which the first bumper is coupled to the first handle at an outer edge of a main body portion of the first handle.

Example 3 includes the game controller of any of Examples 1-2, in which the first handle comprises a user-accessible, first hardware interface on a main body portion of the first handle configured to accept touch inputs.

Example 4 includes the game controller of any of Examples 1-3, further comprising: a bridge extending from a main body portion of the first handle; and a second handle configured to contact and support a mobile device, the bridge extending from a main body portion of the second handle and coupling the second handle to the first handle.

Example 5 includes the game controller of any of Examples 1-4, in which the plunger of the first bumper is configured to contact the first switch at a contact angle, a centerline of the plunger of the first bumper being offset from a centerline of the first switch by the contact angle.

Example 6 includes the game controller of any of Examples 4-5, further comprising a second bumper coupled to the second handle at an outer edge of the main body portion of the second handle, the second bumper configured to accept touch inputs from a user, the second bumper including a pivot rod at a first end of the second bumper and configured to engage a track slot of the second handle, the pivot rod of the second bumper configured to rotate within the track slot of the second handle and to translate within the track slot the second handle, the second bumper further including a plunger at a first-span distance of the second bumper from the pivot rod of the second bumper.

Example 7 includes the game controller of any of Examples 4-6, in which the second handle comprises a user-accessible, second hardware interface on the main body portion of the second handle and configured to accept touch inputs.

Example 8 includes the game controller of any of Examples 4-7, in which the bridge is in sliding engagement with the first handle and the second handle.

Example 9 includes a game controller for a mobile device, the game controller comprising: a first handle configured to couple to a mobile device; a first bumper coupled to the first handle, the first bumper configured to accept touch inputs from a user, the first bumper coupled to the first handle through a dual-action coupling, the dual-action coupling configured to both rotate and translate relative to the first handle, the first bumper further including a plunger at a first-span distance from the dual-action coupling; and a first switch within the first handle, the first switch configured to be activated and deactivated by touch inputs to the first bumper, the plunger of the first bumper being configured to contact and impart a force to the first switch.

Example 10 includes the game controller of Example 9, in which the first bumper is coupled to the first handle at an outer edge of a main body portion of the first handle.

Example 11 includes the game controller of any of Examples 9-10, in which the first handle comprises a user-accessible, first hardware interface on a main body portion of the first handle configured to accept touch inputs.

Example 12 includes the game controller of any of Examples 9-11, further comprising: a bridge extending from a main body portion of the first handle; and a second handle configured to couple to a mobile device, the bridge extending from a main body portion of the second handle and coupling the second handle to the first handle.

Example 13 includes the game controller of Example 12, further comprising a second bumper coupled to the second handle at an outer edge of the main body portion of the second handle, the second bumper configured to accept touch inputs from a user, the second bumper including a pivot rod at a first end of the second bumper and configured to engage a track slot of the second handle, the pivot rod of the second bumper configured to rotate within the track slot of the second handle and to translate within the track slot the second handle, the second bumper further including a plunger at a first-span distance of the second bumper from the pivot rod of the second bumper.

Example 14 includes the game controller of any of Examples 12-13, in which the second handle comprises a user-accessible, second hardware interface on the main body portion of the second handle configured to accept touch inputs.

Example 15 includes the game controller of any of Examples 12-14, in which the bridge is in sliding engagement with the first handle and the second handle.

*****

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the views provided in figures. But the game controller may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

We claim:

1. A handheld game controller comprising:
    a handle;
    a bumper coupled to the handle, the bumper configured to accept touch inputs from a user, the bumper including a pivot rod at an end of the bumper and configured to engage a track slot of the handle, the pivot rod configured to rotate within the track slot and to translate within the track slot, the first bumper further including a plunger at a first-span distance from the pivot rod.

2. The handheld game controller of claim 1, in which the bumper is coupled to the handle at an outer edge of the handle.

3. The handheld game controller of claim 1, in which the handle comprises a user-accessible, hardware interface that is configured to accept touch inputs.

4. The handheld game controller of claim 1, in which the handle is a first handle and the bumper is a first bumper, the game controller further comprising:
    a bridge extending from a main body portion of the first handle; and
    a second handle, the bridge extending from a main body portion of the second handle and coupling the second handle to the first handle.

5. The handheld game controller of claim 4, further comprising a second bumper coupled to the second handle at an outer edge of the second handle, the second bumper configured to accept touch inputs from a user, the second bumper including a pivot rod at an end of the second bumper and configured to engage a track slot of the second handle, the pivot rod of the second bumper configured to rotate within the track slot of the second handle and to translate within the track slot of the second handle, the second bumper further including a plunger at a span distance of the second bumper from the pivot rod of the second bumper.

6. The handheld game controller of claim 4, in which the second handle comprises a user-accessible, second hardware interface that is configured to accept touch inputs.

7. The handheld game controller of claim 4, in which the bridge is in sliding engagement with the first handle and the second handle.

8. A handheld game controller comprising:
    a handle; and a bumper coupled to the handle, the bumper configured to accept touch inputs from a user, the bumper coupled to the handle through a dual-action coupling, the dual-action coupling configured to both rotate and translate relative to the handle, the bumper further including a plunger at a span distance from the dual-action coupling.

9. The handheld game controller of claim 8, in which the bumper is coupled to the handle at an outer edge of the first handle.

10. The handheld game controller of claim 8, in which the handle comprises a user-accessible, hardware interface that is configured to accept touch inputs.

11. The handheld game controller of claim 8, in which the handle is a first handle and the bumper is a first bumper, the game controller further comprising:
   a bridge extending from a main body portion of the first handle; and
   a second handle, the bridge extending from a main body portion of the second handle and coupling the second handle to the first handle.

12. The handheld game controller of claim 11, further comprising a second bumper coupled to the second handle at an outer edge of the second handle, the second bumper configured to accept touch inputs from a user, the second bumper including a pivot rod at an end of the second bumper and configured to engage a track slot of the second handle, the pivot rod of the second bumper configured to rotate within the track slot of the second handle and to translate within the track slot of the second handle, the second bumper further including a plunger at a span distance of the second bumper from the pivot rod of the second bumper.

13. The handheld game controller of claim 11, in which the second handle comprises a user-accessible, second hardware interface that is configured to accept touch inputs.

14. The handheld game controller of claim 11, in which the bridge is in sliding engagement with the first handle and the second handle.

15. The handheld game controller of claim 1, further comprising a spring configured to bias the bumper in an undepressed condition.

16. The handheld game controller of claim 7, in which the bridge has a span extending away from the first handle, the span having a transverse midline, the midline of the bridge being between the first handle and the second handle, the bridge and the first handle being configured for the first handle to translate in a retraction direction toward the midline of the bridge and into a retracted configuration and also to translate in an extension direction away from the midline of the bridge into an extended configuration, the bridge and the second handle being configured for the second handle to translate along the bridge in the retraction direction toward the midline of the bridge and into the retracted configuration and also to translate in the extension direction away from the midline of the bridge and into the extended configuration.

17. The handheld game controller of claim 4, further comprising a mobile device contacted and supported by the first handle and the second handle.

18. The handheld game controller of claim 8, further comprising a spring configured to bias the bumper in an undepressed condition.

19. The handheld game controller of claim 8, in which the bridge has a span extending away from the first handle, the span having a transverse midline, the midline of the bridge being between the first handle and the second handle, the bridge and the first handle being configured for the first handle to translate in a retraction direction toward the midline of the bridge and into a retracted configuration and also to translate in an extension direction away from the midline of the bridge into an extended configuration, the bridge and the second handle being configured for the second handle to translate along the bridge in the retraction direction toward the midline of the bridge and into the retracted configuration and also to translate in the extension direction away from the midline of the bridge and into the extended configuration.

\* \* \* \* \*

UNITED STATES PATENT AND TRADEMARK OFFICE
CERTIFICATE OF CORRECTION

PATENT NO. : 12,194,374 B2  
APPLICATION NO. : 17/504299  
DATED : January 14, 2025  
INVENTOR(S) : Maneet Singh Khaira et al.

Page 1 of 1

It is certified that error appears in the above-identified patent and that said Letters Patent is hereby corrected as shown below:

In the Claims

Column 14, Claim 1, Line 33, delete "first".

Signed and Sealed this  
Fourth Day of March, 2025

Coke Morgan Stewart  
*Acting Director of the United States Patent and Trademark Office*